(12) United States Patent
Yoshioka

(10) Patent No.: US 9,160,538 B2
(45) Date of Patent: Oct. 13, 2015

(54) DETECTION METHOD FOR FRAUDULENT MAIL, DETECTION PROGRAM THEREFOR, AND DETECTION DEVICE THEREFOR

(71) Applicant: FUJITSU LIMITED, Kawasaki-shi, Kanagawa (JP)

(72) Inventor: Takashi Yoshioka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 134 days.

(21) Appl. No.: 14/063,481

(22) Filed: Oct. 25, 2013

(65) Prior Publication Data
US 2014/0181516 A1    Jun. 26, 2014

(30) Foreign Application Priority Data
Dec. 20, 2012  (JP) .................. 2012-278590

(51) Int. Cl.
*H04L 9/32* (2006.01)
*H04L 12/58* (2006.01)
*H04L 29/06* (2006.01)

(52) U.S. Cl.
CPC ............ *H04L 9/3236* (2013.01); *H04L 51/066* (2013.01); *H04L 63/126* (2013.01); *H04L 63/0435* (2013.01); *H04L 63/0442* (2013.01)

(58) Field of Classification Search
None
See application file for complete search history.

(56) References Cited

U.S. PATENT DOCUMENTS

| 2006/0075246 | A1* | 4/2006 | Suga ............................ 713/176 |
| 2006/0085505 | A1  | 4/2006 | Gillum et al. |
| 2006/0239452 | A1* | 10/2006 | Jung et al. ...................... 380/44 |
| 2006/0242251 | A1* | 10/2006 | Estable ........................ 709/207 |
| 2006/0264202 | A1* | 11/2006 | Hagmeier et al. ............ 455/411 |

(Continued)

FOREIGN PATENT DOCUMENTS

JP    2006-134313    5/2006

OTHER PUBLICATIONS

"DomainKeys Identified Mail (DKIM)", url: http://www.dkim.org/, obtained Apr. 4, 2012, 2 pages.

(Continued)

*Primary Examiner* — Benjamin Lanier
*Assistant Examiner* — Wayne An
(74) *Attorney, Agent, or Firm* — Staas & Halsey LLP

(57) ABSTRACT

Preliminarily sharing internal-transmission-secret-key-information used in e-mail addressed to an internal-network, between transmitting and receiving-terminals, and generating external-transmission-secret-key information used in an e-mail addressed to an external-network and external-transmission-public-key-information corresponding to the external-transmission-secret-key-information, in transmitting a mail, generating verification-information by encrypting first characteristic-amount-target-information including a characteristic-amount-target-item included in an outgoing-mail and adding, to the outgoing-mail header, the verification-information and characteristic-amount-target-item-information corresponding to the characteristic-amount-target-item, and, in receiving a mail, generating second characteristic-amount-target-information including a characteristic-amount-target-item indicated by the characteristic-amount-target-item-information added to the incoming-mail, decrypting the verification-information, generating third characteristic-amount-target-information, and verifying whether the second and the third coincide.

4 Claims, 28 Drawing Sheets

(56) References Cited

U.S. PATENT DOCUMENTS

2009/0013379 A1* 1/2009 Yoshioka et al. ............... 726/2
2009/0100079 A1* 4/2009 Yoshioka ..................... 707/100
2013/0305367 A1* 11/2013 Yoshioka et al. ............. 726/23

OTHER PUBLICATIONS

"Sender Policy Framework Project Overview", url: http://www.openspf.org/, obtained Apr. 4, 2012, 4 pages.

* cited by examiner

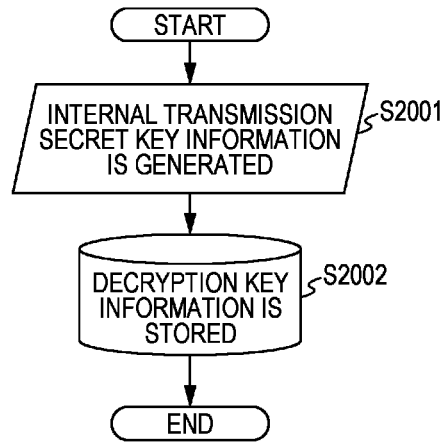
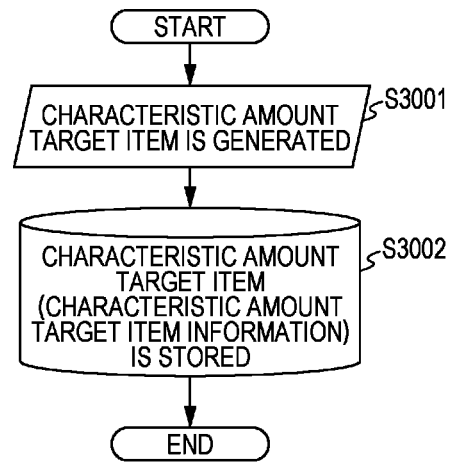

FIG. 11

| DEGREE OF IMPORTANCE A | From, To, Subject, Received, Date, Message-Id, X-Mailer, Body, File |
|---|---|
| DEGREE OF IMPORTANCE B | From, To, Subject, Received, Date, Message-Id, Body, File |
| DEGREE OF IMPORTANCE C | From, Subject, Date, Body, File |
| DEGREE OF IMPORTANCE D | From, Subject, Date, Body |
| ... | ... |

DETECTION METHOD FOR FRAUDULENT MAIL, DETECTION PROGRAM THEREFOR, AND DETECTION DEVICE THEREFOR

CROSS-REFERENCE TO RELATED APPLICATION

This application is based upon and claims the benefit of priority of the prior Japanese Patent Application No. 2012-278590, filed on Dec. 20, 2012, the entire contents of which are incorporated herein by reference.

FIELD

The embodiments discussed herein are related to a detection method for a fraudulent mail, a detection program therefor, and a detection device therefor.

BACKGROUND

In recent years, the number of targeted attacks aimed at a specific company or personal computers has rapidly increased, and, in particular, the number of targeted attacks (hereinafter, referred to as targeted attack mails) against companies or government organizations has rapidly increased, the targeted attacks being due to fraudulent electronic mails. The targeted attack mail is a virus mail sent for the purpose of the theft of confidential information with a specific company or organization as a target, and opening an attached file in which an illegal code is set up results in executing a fraudulent act such as the leakage of personal information.

In existing antivirus software, malicious program collation information relating to a problematic program is registered as a signature, and a program coincident therewith is detected, and hence, an infection is avoided. However, such antivirus software is not suitable for an attack mail utilizing a program having no signature. Furthermore, since it may be difficult for the antivirus software to understand that an attached file or a body text is carefully created and contrived at first glance, it may be difficult to sufficiently avert. In addition, each user is limited in strictly checking the consistency of an electronic mail header, an attached file, a body text, a sender address, and so forth.

As a countermeasure technique of the related art, there has been sending domain authentication. This is a technique for realizing the legitimacy of an outgoing mail server and the trail of a transmission path on a server basis. Specifically, the domain of an electronic mail address is checked, it is verified whether or not the electronic mail is sent from a legitimate server, and it is certified that the address of a sender is legitimate.

The types of sending domain authentication mainly include authentication due to an IP address and authentication due to an electronic signature. The former discloses, to a domain name system (DNS) server, an association (SPF record) between the domain of an electronic mail server and the IP address of a sender using a sender policy framework (SPF) and a sender ID, and makes an inquiry to the DNS server about a sender IP address at the time of receiving, and performs collation. Accordingly, the former confirms that the address of a sender is legitimate.

The latter discloses, to a DNS server, the public key information of an electronic mail server using a domain keys identified mail (DKIM), transmits an electronic mail with adding thereto an electronic signature using a secret key, makes an inquiry to the DNS server about public key information at the time of receiving, and performs collation on the electronic signature. Accordingly, the latter confirms that the address of a sender is legitimate.

A related technique has also been disclosed in Japanese Laid-open Patent Publication No. 2006-134313.

In the case of a targeted attack mail, a transmission source address is also disguised, and the targeted attack mail is disguised as being transmitted using a legitimate server. Therefore, by checking a transmission source address owing to a method of the related art, it may be difficult to ensure an identity. In addition, it is desirable that a DNS server used for detecting a targeted attack mail is installed, and an operational cost becomes large.

Objects of the present embodiment are to provide a detection method, a detection program, and a detection device, which are capable of detecting a fraudulent mail such as a targeted attack mail, on a client basis.

SUMMARY

According to an aspect of the invention, a fraudulent mail detection method executed by a computer in an electronic mail terminal device, the method includes preliminarily sharing internal transmission secret key information used in an electronic mail addressed to an internal network, between a transmitting terminal and a receiving terminal, and preliminarily generating external transmission secret key information used in an electronic mail addressed to an external network and external transmission public key information corresponding to the external transmission secret key information. At the time of transmitting a mail, generating verification information by encrypting, using the internal transmission secret key information, first characteristic amount target information including a characteristic amount target item from among a header item, a body text, and attached information, included in an outgoing mail, or first characteristic amount information generated from the first characteristic amount target information on the basis of a predetermined function when a transmission destination of the outgoing mail is the internal network, and generating the verification information by encrypting, using the external transmission secret key information, the first characteristic amount target information or the first characteristic amount information when the transmission destination of the outgoing mail is the external network, and adding, to a header of the outgoing mail, the verification information and characteristic amount target item information corresponding to the characteristic amount target item. And at the time of receiving a mail, generating second characteristic amount target information including a characteristic amount target item indicated by the characteristic amount target item information added to the incoming mail, from among a header item, a body text, and attached information, included in the incoming mail, or generating second characteristic amount information from the second characteristic amount target information on the basis of the predetermined function, decrypting, using the internal transmission secret key information, the verification information added to the incoming mail when a transmission source of the incoming mail is the internal network, decrypting, using the external transmission public key information, the verification information added to the incoming mail when the transmission source of the incoming mail is the external network, and generating third characteristic amount target information or third characteristic amount information, and comparing the second characteristic amount target information or the second characteristic amount information with the third characteristic amount target information or the third characteristic amount information, and verifying whether or not the second characteristic amount target information or the second characteristic amount information and the third characteristic amount target information or the third characteristic amount information coincide with each other.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a flowchart diagram of processing of a mail checker, performed as advance preparation for starting transmission and reception processing for an electronic mail;

FIG. 10 is a flowchart diagram of processing of a mail checker, performed as advance preparation for starting transmission and reception processing for an electronic mail;

FIG. 11 is a diagram illustrating an example of a list of candidates of characteristic amount target items set in response to the degrees of importance of contents of mails;

DESCRIPTION OF EMBODIMENTS

First Embodiment

In the present embodiment, a fraudulent mail is, for example, a targeted attack mail. Since being apparently similar to a normal mail usually received by a recipient, the targeted attack mail sneaks through filtering for a spam mail and a virus mail, and is received. In addition, when the recipient opens an attached file of the incoming mail or accesses an attached URL, the targeted attack mail executes some type of fraudulent act such as, for example, accessing personal information. Being apparently similar corresponds to, for example, a case where a transmission source address or a body text is the same as or closely similar to a normal mail and it is difficult for a general filter for a spam mail or a virus mail to stop the targeted attack mail.

A mail checker in the present embodiment is a program installed into a terminal device along with mail software. When the mail software transmits an electronic mail, the mail checker generates and adds, to the electronic mail, verification information to be described below. In addition to this, when the mail software has received an electronic mail, the mail checker performs verification processing utilizing verification information to be described below, and issues an alert warning to a user about an incoming mail suspected to be a fraudulent mail.

The generation of the verification information is performed in encryption processing utilizing predetermined encryption key information. In addition to this, in an outgoing mail to be transmitted into an intranet (internal network), internal transmission secret key information internally managed in secret is used, and, in an outgoing mail to be transmitted to the Internet (external network), external transmission secret key information and the public key information thereof are used. The internal transmission secret key information is shared by electronic mail terminal devices within the intranet. However, since it is difficult to share a common key with an electronic mail terminal in the external network, an encryption method due to the secret key information and the public key information is used.

In addition, as encryption target information, characteristic amount information is used that is generated by carrying out an operation on information extracted from the header information, the body text, or the attached information of an outgoing mail, using a function based on a predetermined algorithm. Accordingly, by keeping confidential which information of an outgoing mail is extracted and which algorithm a function for generating the characteristic amount information is based on, it may be possible to further enhance security.

[Configuration of Electronic Mail System]

Figure 1:
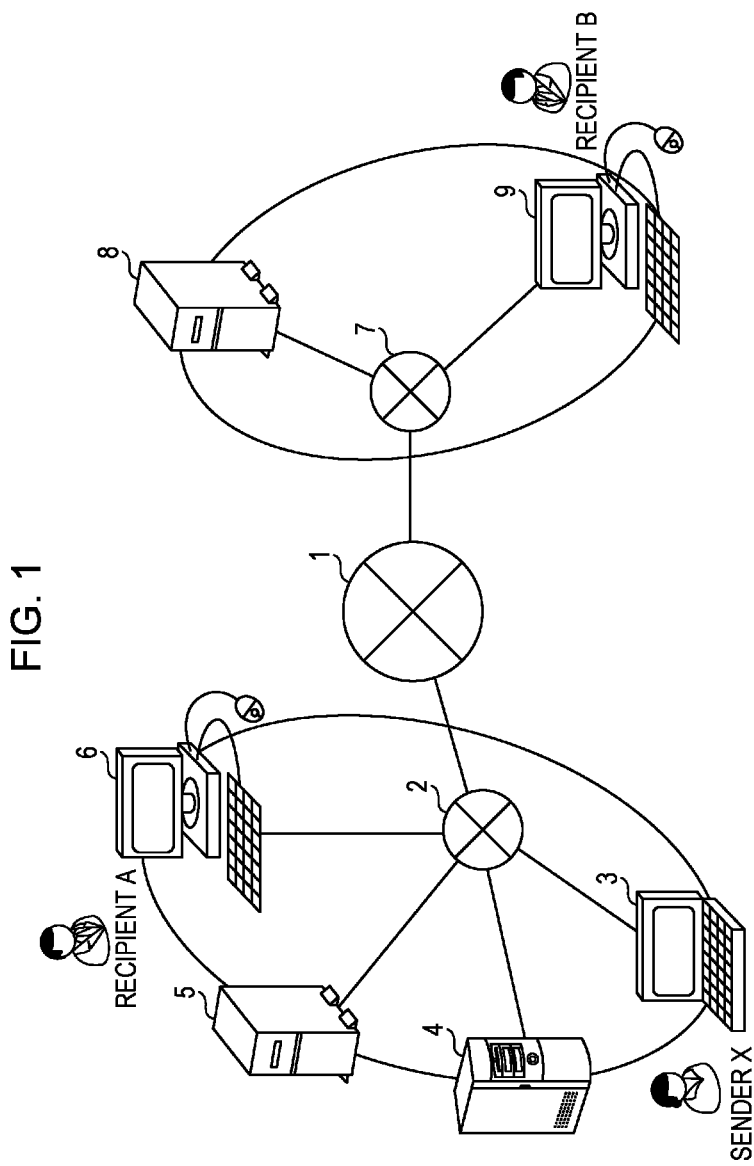
FIG. 1 is a configuration diagram of an electronic mail system in a first embodiment.

FIG. 1 is the configuration diagram of an electronic mail system in the present embodiment. The structure of the electronic mail system is described with reference to FIG. 1.

In FIG. 1, through an Internet communication line network 1, two intranets 2 and 7 are connected. The electronic mail transmitting terminal 3 of a sender X, the electronic mail receiving terminal 6 of a recipient A, an outgoing mail (SMTP) server 4, and an incoming mail (POP) server 5 are connected to the intranet 2 the sender X and the recipient A use.

In addition, an incoming mail (POP) server 8 and an electronic mail receiving terminal 9 are connected to the intranet 7 a recipient B uses.

The SMTP is a simple mail transfer protocol, and a protocol used for transmitting an electronic mail through Internet or an intranet. Using the present protocol, it may be possible for the outgoing mail (SMTP) server 4 to transmit an electronic mail. The POP is a post office protocol, and a protocol used for receiving a mail from a server storing therein an electronic mail on Internet or an intranet. Using the present protocol, it may be possible for the incoming mail (POP) server 5 and the incoming mail (POP) server 8 to receive electronic mails.

In the present embodiment, a case is described where the sender X transmits an electronic mail from the electronic mail transmitting terminal 3 to the electronic mail receiving terminal 6 of the recipient A within the intranet 2, or to the electronic mail receiving terminal 9 of the recipient B within the external intranet 7 through the Internet 1. It may be natural for the sender X to be capable of transmitting electronic mails to the recipients A and B owing to broadcast communication.

[Configuration of Each Terminal Device in Electronic Mail System]

Figure 2:
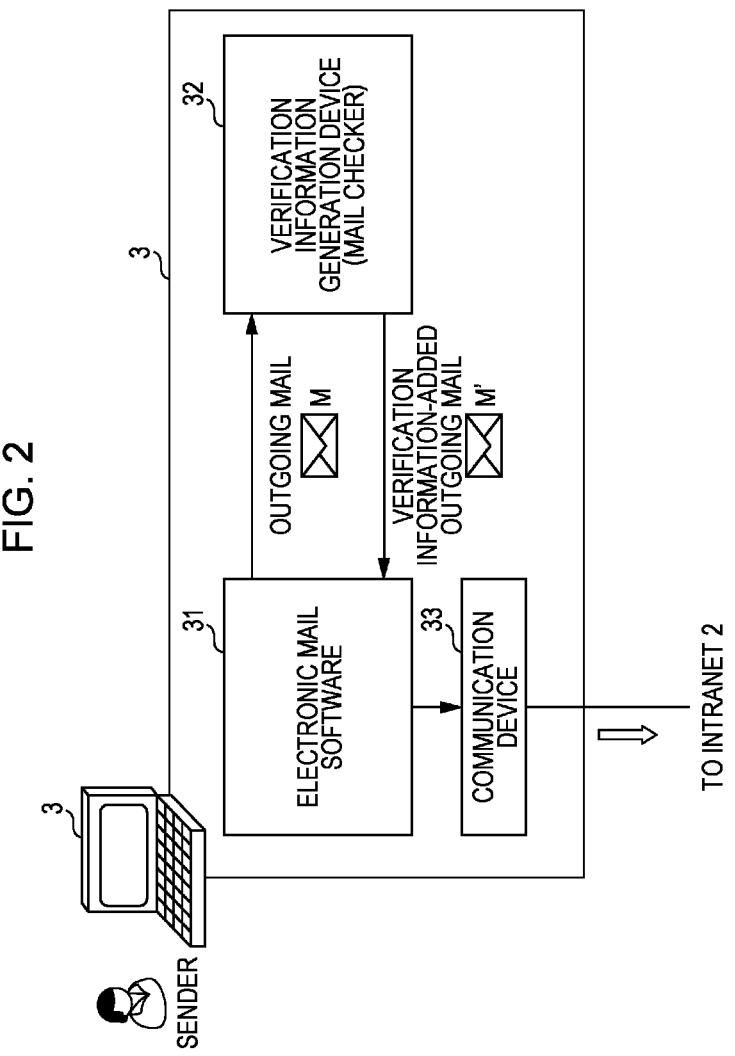
FIG. 2 is a configuration diagram of an electronic mail transmitting terminal a sender uses.

FIG. 2 is the configuration diagram of an electronic mail transmitting terminal a sender uses. The electronic mail transmitting terminal 3 includes electronic mail software 31 where the sender creates an electronic mail or issues an instruction for transmission, a verification information generation device 32 generating verification information to be information used for confirming whether or not there is the possibility of being a targeted attack mail, and a communication device 33 transmitting an electronic mail through the intranet 2. The electronic mail software 31 corresponds to a mailer program such as, for example, Outlook of Microsoft Corporation or Thunderbird of Mozilla Corporation. In addition, the verification information generation device 32 corresponds to a portion of a mail checker program detecting a fraudulent mail.

Figure 3:
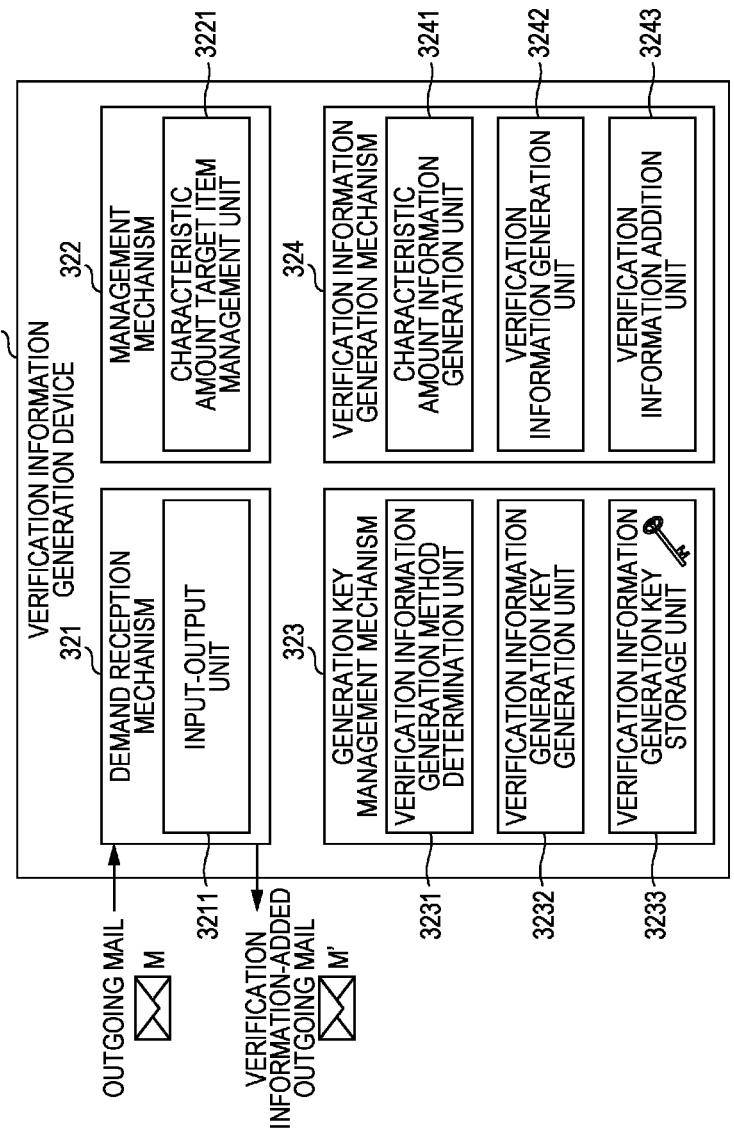
FIG. 3 is a configuration diagram of a verification information generation device.

FIG. 3 is the configuration diagram of a verification information generation device. The verification information generation device 32 includes a demand reception mechanism 321, a management mechanism 322, a generation key management mechanism 323, and a verification information generation mechanism 324.

The demand reception mechanism 321 includes an input-output unit 3211, receives, from the electronic mail software 31, a demand relating to a request to generate verification information with respect to an outgoing mail M, and returns a verification information-added outgoing mail M'.

The management mechanism 322 includes a characteristic amount target item management unit 3221, and manages a characteristic amount target item indicating the target of a characteristic amount when the characteristic amount is generated from an outgoing mail.

The generation key management mechanism 323 handles a generation key used when the verification information is generated. Examples of this generation key include the internal transmission secret key information, the external transmission secret key information, and the external transmission public key information paired with the external transmission secret key information, which are described above. The generation key management mechanism 323 includes a verification information generation method determination unit 3231 determining whether to use the internal transmission secret key or the external transmission secret key, a verification information generation key generation unit 3232 generating the above-mentioned three pieces of key information, and a verification information generation key storage unit 3233 storing therein in secret the internal transmission secret key information and the external transmission secret key information from among the three pieces of key information.

The verification information generation mechanism 324 generates verification information and adds the verification information to an outgoing mail. The verification information generation mechanism 324 includes a characteristic amount information generation unit 3241 generating characteristic amount information and so forth from the header information, the body text, or the attached information of the outgoing mail, a verification information generation unit 3242 generating verification information by encrypting the characteristic amount information using the above-mentioned internal or external transmission secret key information, and a verification information addition unit 3243 adding the generated verification information and so forth, to the header of the outgoing mail.

Figure 4:
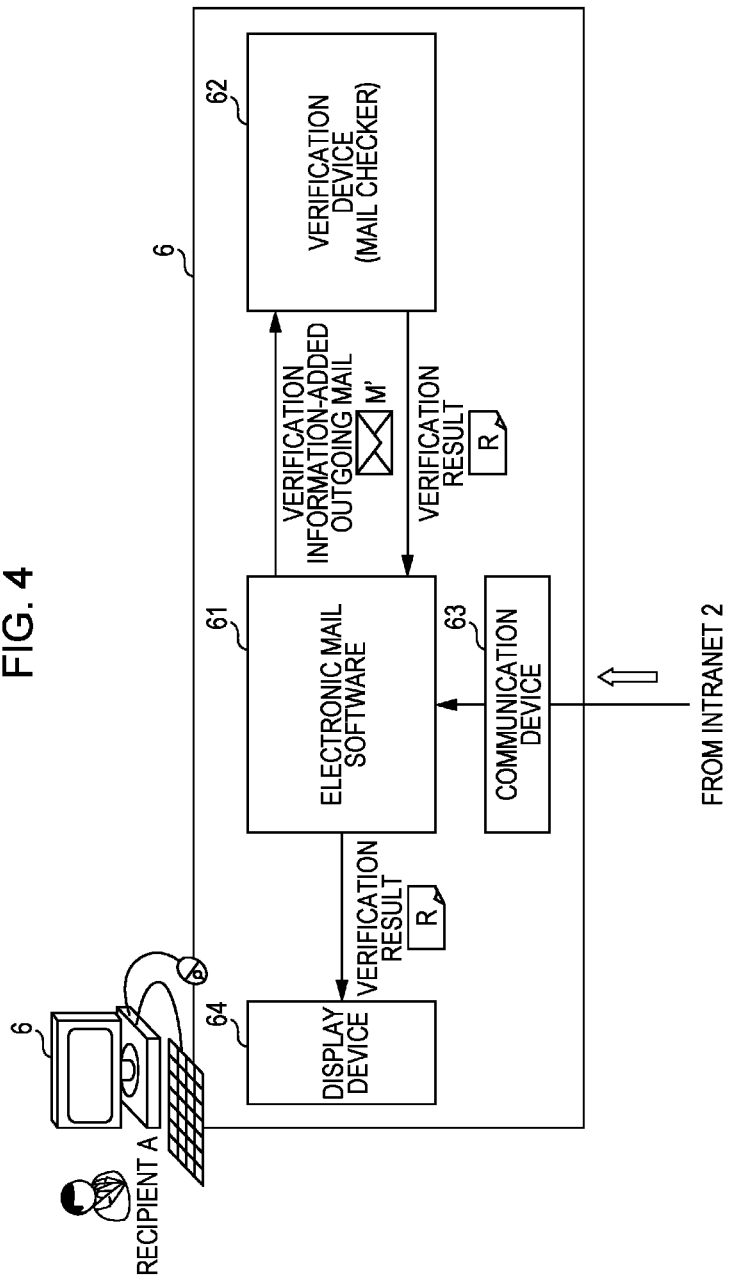
FIG. 4 is a configuration diagram of an electronic mail receiving terminal.
Figure 5:
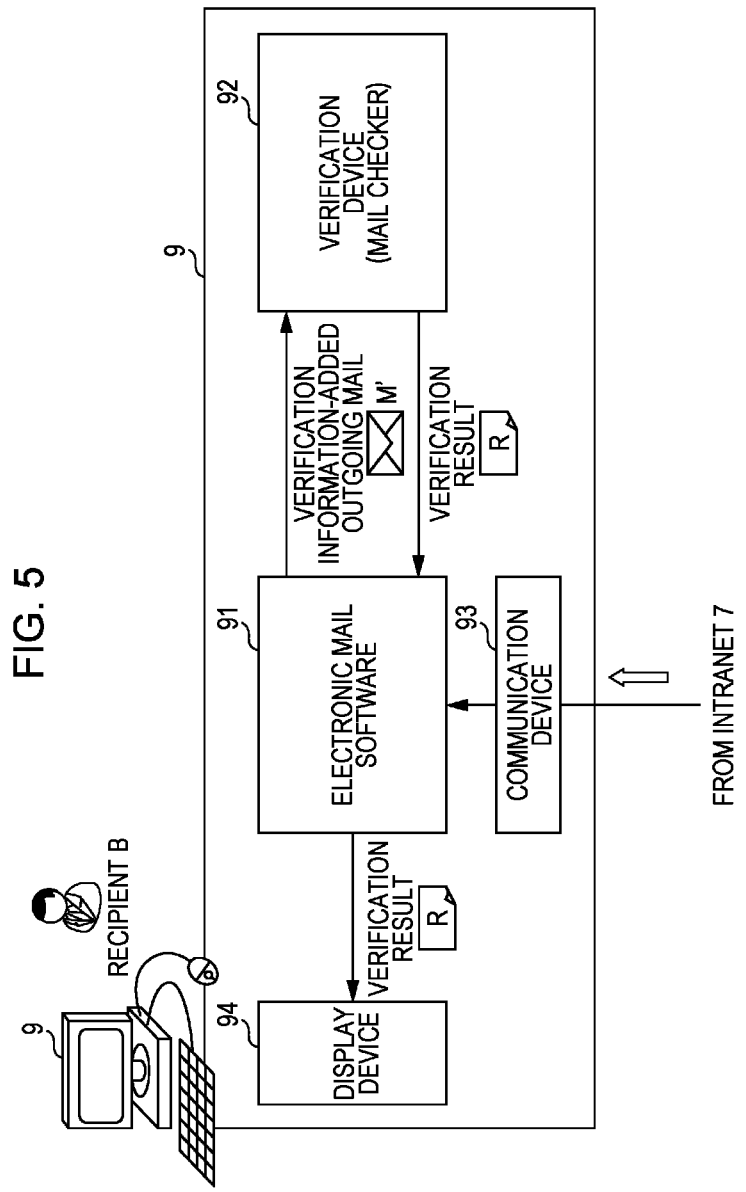
FIG. 5 is a configuration diagram of an electronic mail receiving terminal.

FIG. 4 is the configuration diagram of the electronic mail receiving terminal 6. FIG. 5 is the configuration diagram of the electronic mail receiving terminal 9. The electronic mail receiving terminal 6 in FIG. 4 is a terminal the recipient A connected to the intranet 2 uses, and the electronic mail receiving terminal 9 in FIG. 5 is a terminal the recipient B connected to the intranet 7 uses.

The electronic mail receiving terminals 6 and 9 include pieces of electronic mail software 61 and 91 where the recipients A and B issue instructions to receive electronic mails, verification devices 62 and 92 verifying verification information, and communication devices 63 and 93 receiving the electronic mails from the intranets 2 and 7, respectively. The pieces of electronic mail software 61 and 91 correspond to mailer programs such as, for example, Outlook of Microsoft Corporation or Thunderbird of Mozilla Corporation, in the same way as the electronic mail transmitting terminal 3. In addition, the verification devices 62 and 92 correspond to portions of mail checker programs detecting fraudulent mails.

Figure 6:
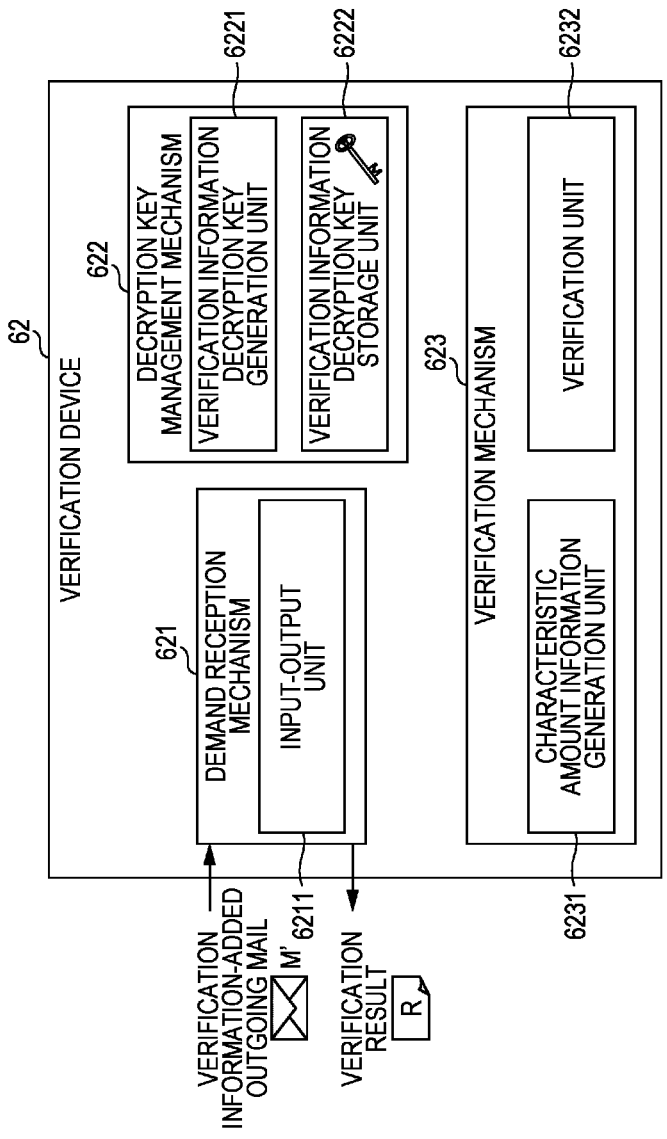
FIG. 6 is a configuration diagram of a verification device in an electronic mail receiving terminal.

FIG. 6 is the configuration diagram of the verification device in the electronic mail receiving terminal 6. The verification device 62 includes a demand reception mechanism 621, a decryption key management mechanism 622, and a verification mechanism 623.

The demand reception mechanism 621 includes an input-output unit 6211, receives a demand relating to a request to verify verification information included in an electronic mail received from the electronic mail software 61, and returns the verification result thereof.

The decryption key management mechanism 622 generates and manages a decryption key used when the verification information is decrypted. This decryption key is the above-mentioned internal transmission secret key information, and used when an electronic mail transmitted from the internal intranet 2 is verified. The decryption key management mechanism 622 includes a verification information decryption key generation unit 6221 and a verification information decryption key storage unit 6222.

The verification mechanism 623 generates characteristic amount information from the information (header information, a body text, or an attached information) of a characteristic amount target item, further generates characteristic amount information by decrypting verification information added to an incoming mail, using a decryption key, and compares the two pieces of characteristic amount information with each other to verify the verification information. The verification mechanism 623 includes a characteristic amount information generation unit 6231 generating a characteristic amount and a verification unit 6232 verifying verification information.

Figure 7:
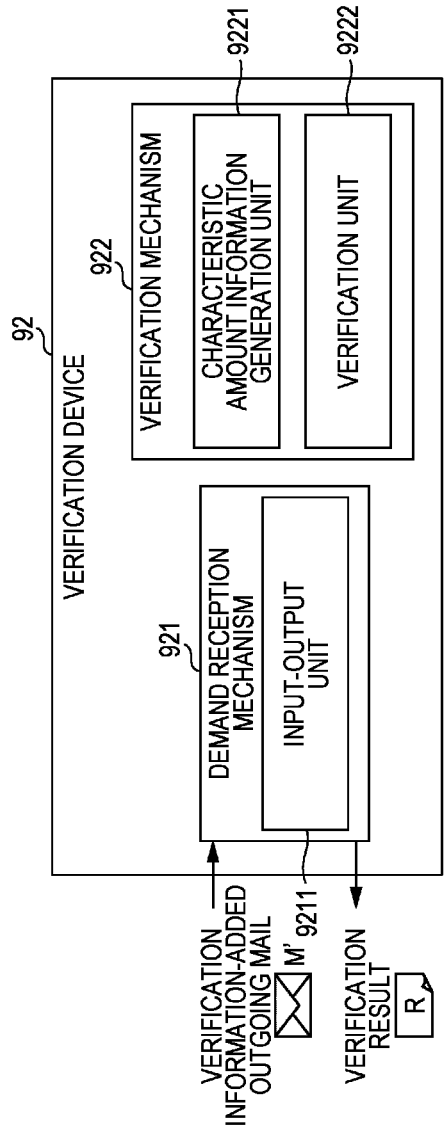
FIG. 7 is a configuration diagram of a verification device in an electronic mail receiving terminal.

FIG. 7 is the configuration diagram of the verification device in the electronic mail receiving terminal 9. The verification device 92 includes a demand reception mechanism 921 and a verification mechanism 922. The demand reception mechanism 921 includes an input-output unit 9211, receives a demand relating to a request to verify verification information included in an electronic mail received from the electronic mail software 91, and returns the verification result thereof.

The verification mechanism 922 generates characteristic amount information from the information (header information, a body text, or an attached information) of a characteristic amount target item, further generates characteristic amount information by decrypting verification information added to an incoming mail, using a decryption key, and compares the two pieces of characteristic amount information with each other to verify the verification information. The verification mechanism 922 includes a characteristic amount information generation unit 9221 and a verification unit 9222. Since the electronic mail receiving device 9 in the intranet 7 located outside of the intranet 2 of the sender X is based on an assumption that the verification device 92 receives and verifies an electronic mail from the outside, the verification device 92 does not retain a decryption key management mechanism storing therein internal transmission secret key information.

[Processing in Electronic Mail System]
[Processing for Advance Preparation]

Next, the flow of processing in an electronic mail system is described. As explained as the premise thereof, as illustrated in FIG. 1, the sender X creates an outgoing mail using the electronic mail transmitting terminal 3, verification information is generated and added to the outgoing mail owing to the mail checker, and the outgoing mail is transmitted so as to be addressed to the recipient A or B. In addition, the recipient A receives the electronic mail using the electronic mail receiving terminal 6, the electronic mail is verified by the mail checker, and an alert warning is output when the electronic mail is suspected to be a fraudulent mail such as a targeted attack mail. In the same way, the recipient B receives the electronic mail using the electronic mail receiving terminal 9, and the electronic mail is verified by the mail checker to output an alert warning.

Figure 8:
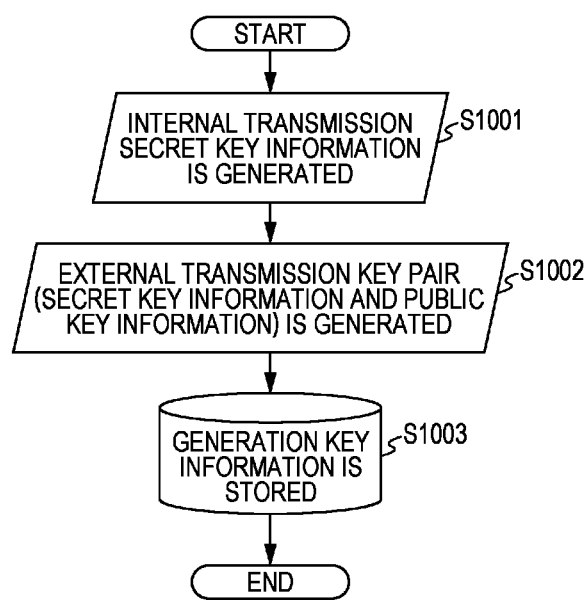
FIG. 8 is a flowchart diagram of processing of a mail checker, performed as advance preparation for starting transmission and reception processing for an electronic mail.

FIG. 8, FIG. 9, and FIG. 10 are the flowchart diagrams of the processing operations of a mail checker, performed as advance preparation for starting transmission and reception processing for an electronic mail.

FIG. 8 is the flowchart diagram of processing of the generation and storage of an authentication information generation key, due to the generation key management mechanism 323 in the electronic mail transmitting terminal 3. In the electronic mail transmitting terminal 3, it is desirable that before transmission processing for an electronic mail is performed, an authentication information generation key used for generating authentication information is generated in advance and stored.

Therefore, the generation key management mechanism 323 generates internal transmission secret key information (S1001), and further generates external transmission secret key information and public key information, which serve as a pair of external transmission keys (S1002), and the verification information generation key storage unit 3233 stores therein these pieces of key information (S1003). At this time, the secret key information used for internal transmission and the secret key information used for external transmission are safely stored so as not to be information-leaked to the outside.

A transmitting side and a receiving side share the internal transmission secret key information as an internal transmission key, and hence, it may be possible to generate verification information using information known to only both thereof. Therefore, if not knowing the secret information, it may be difficult for an attacker to create the verification information. Owing to this, it may become possible to protect against a fraudulent electronic mail.

FIG. 9 is the flowchart diagram of processing for the generation and storage of a decryption key, due to the decryption key management mechanism 622 in the electronic mail receiving terminal 6. In the electronic mail receiving terminal 6, it is desirable that processing is performed where, before reception processing for an electronic mail is performed, a key used for decrypting verification information is generated in advance and stored.

Therefore, the decryption key management mechanism 622 generates internal transmission secret key information (S2001), and the decryption key storage unit 6222 stores therein the information (S2002). At this time, the internal transmission secret key information is safely stored so as not to be information-leaked to the outside.

It is desirable that the pieces of internal transmission secret key information serving as an encryption key in a transmitting terminal and a decryption key in a receiving terminal are created in the transmitting terminal and the receiving terminal on the basis of the same algorithm, and it is desirable that the pieces of internal transmission secret key information become the same information known to only the verification information generation device 32 in the transmitting terminal and the verification device 62 in the receiving terminal.

FIG. 10 is the flowchart diagram of processing for the generation and storage of a characteristic amount target item in the management mechanism 322 in the electronic mail transmitting terminal 3. In the electronic mail transmitting terminal 3, it is desirable that before starting transmitting an electronic mail, a characteristic amount target item is preliminarily selected that indicates which item of the header information, the body text information, and the attached information of an outgoing mail is extracted to generate characteristic amount information. This characteristic amount target item is, in other words, information indicating which item of information included in the outgoing mail is to be a verification target, and the verification information generation device 32 determines the characteristic amount target item. Information (for example, a From header, a body text Body, or the like) indicating the characteristic amount target item is called characteristic amount target item information. In addition, the information of the characteristic amount target item (for example, the address of the From header when the characteristic amount target item is the From header) is called characteristic amount target information.

In this case, the verification information generation device 32 may manage a generation policy for the characteristic amount target item. In addition, the characteristic amount target item may also be individually generated in units of mails in accordance with the degrees of importance of the contents of mails, and all the created mails may also be generated owing to the same target header item. This control may also be performed owing to the above-mentioned generation policy information for the characteristic amount target item.

FIG. 11 is a diagram illustrating an example of the list of candidates of characteristic amount target items set in response to the degrees of importance of the contents of mails. In this example, in response to the degrees of importance of electronic mails, characteristic amount target items are different, and the number of selected items increases as the degree of importance draws nigh to "A" (namely, the degree of importance becomes high).

After a characteristic amount target item is selected in response to the degree of importance of the content of a mail with reference to the list of candidates of characteristic amount target items in FIG. 11 or a preliminarily decided candidate is selected, the characteristic amount information is generated is described later.

In the present embodiment, an example is described where characteristic amount target items (the items of From, Subject, Date, and Body) having the degree of importance D are selected. In addition, the management mechanism 322 generates (selects) the characteristic amount target items (S3001), and the characteristic amount target item management unit 3221 stores therein the characteristic amount target item information thereof (S3002).

From among the above-mentioned processing operations for advance preparation, the generation of secret key information is performed as registration processing, for example, when the mail checker is installed, and the secret key information is periodically changed. The internal transmission secret key information is secretly shared by all mail checkers within the same intranet. In addition, the external transmission secret key information is secretly shared by all mail checkers.

In addition, it is desirable that an algorithm for after-mentioned characteristic amount generation, namely, information (characteristic amount generation function information) relating to which function the characteristic amount information is generated by, is also decided in the stage of advance preparation and secretly shared by all the mail checkers. The generation and storage of the characteristic amount generation function information are performed by, for example, the management mechanism 322 in the electronic mail transmitting terminal 3. In addition, that characteristic amount generation function information is shared with the electronic mail receiving terminals 6 and 9.

[Transmission Processing for Electronic Mail]

Next, transmission processing for an electronic mail is described that is performed by the electronic mail transmitting terminal 3.

Figure 12:
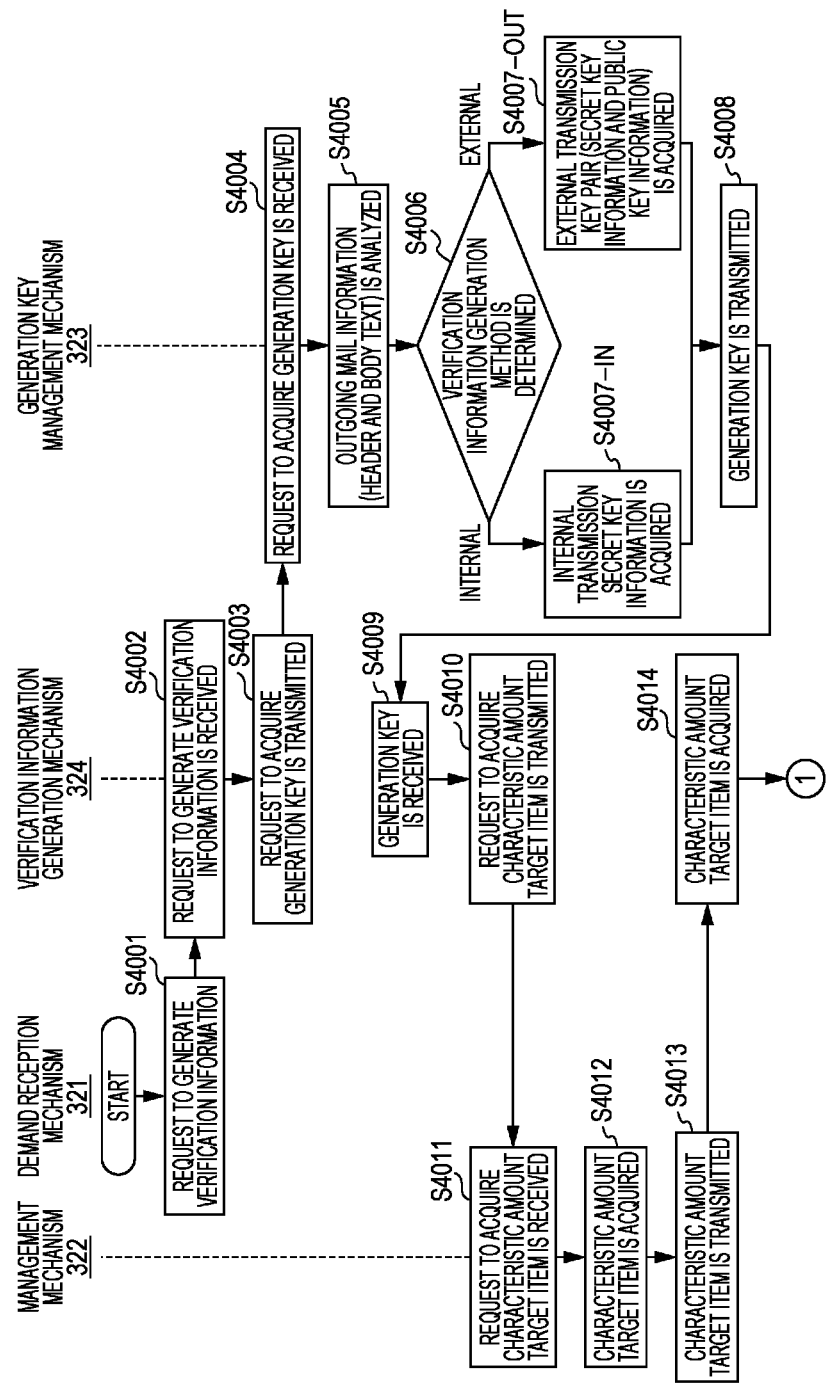
FIG. 12 is a flowchart diagram of generation processing for verification information in a verification information generation device in an electronic mail transmitting terminal.
Figure 13:
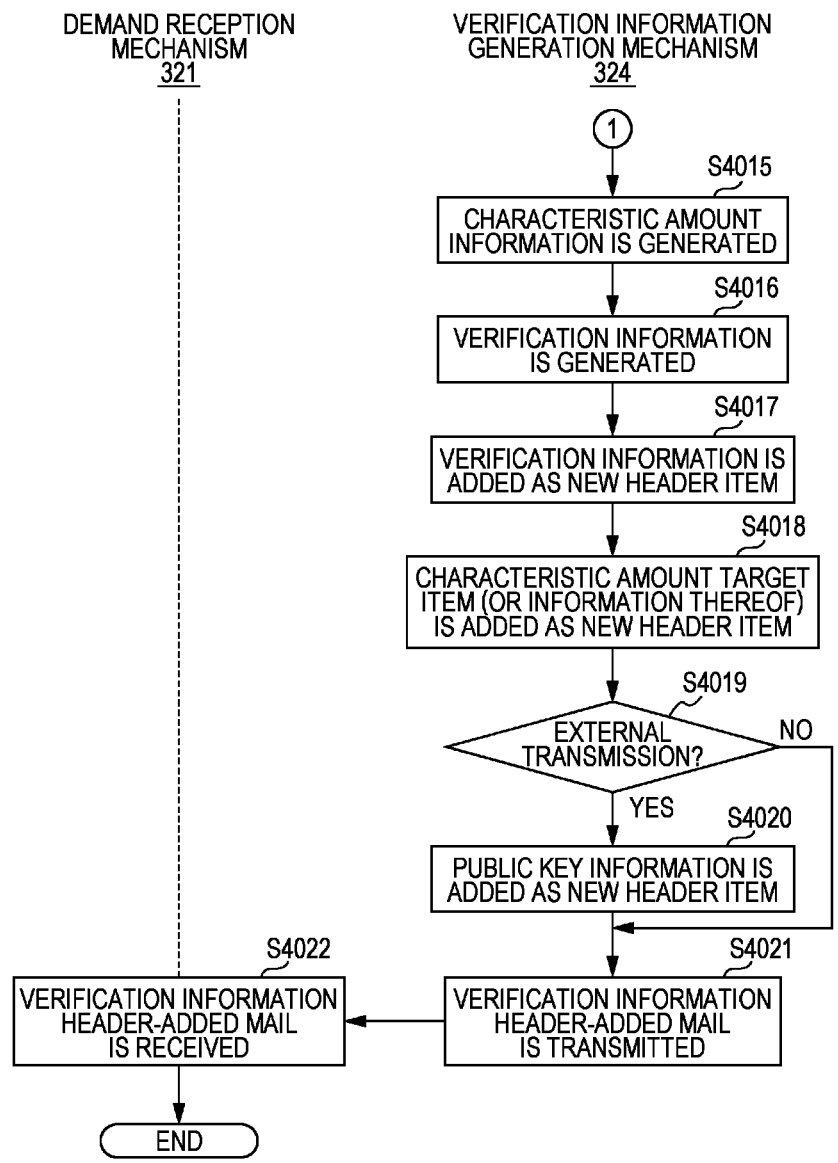
FIG. 13 is a flowchart diagram of generation processing for verification information in a verification information generation device in an electronic mail transmitting terminal.
Figure 14:
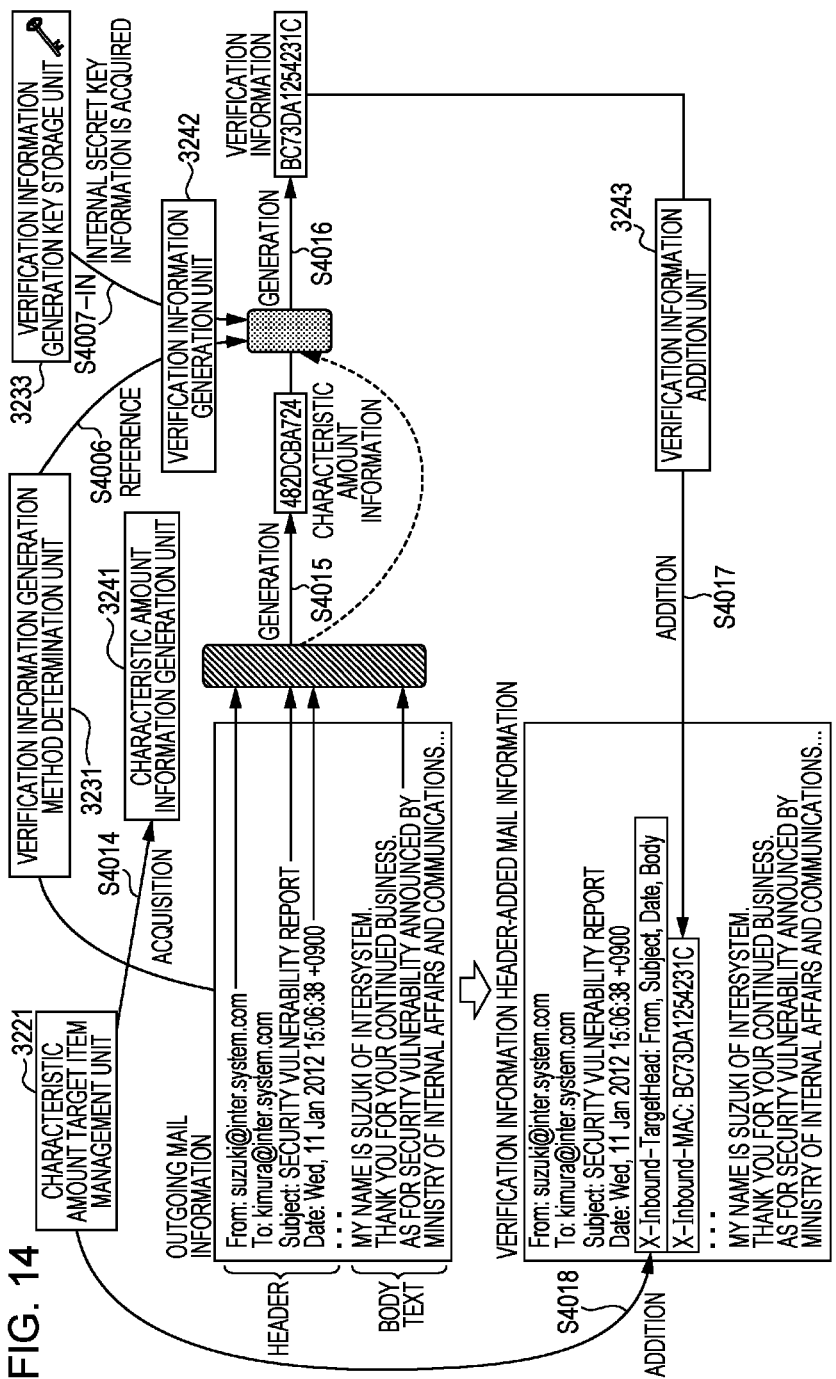
FIG. 14 is a diagram illustrating an example of processing for generation and addition of verification information when an internal transmission generation key (internal transmission secret key information) is used.
Figure 15:
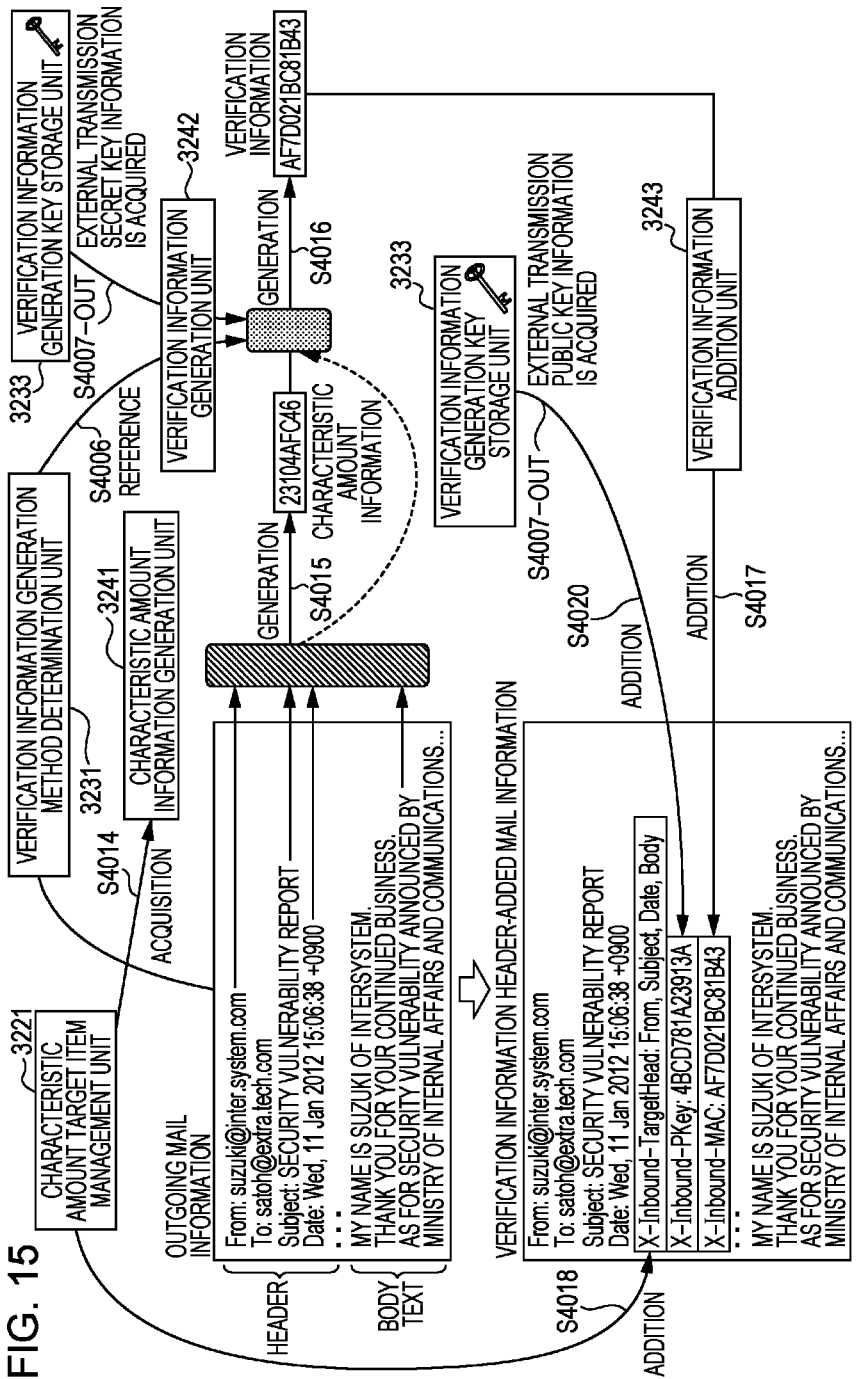
FIG. 15 is a diagram illustrating an example of processing for generation and addition of verification information when an external transmission generation key (external transmission secret key information) is used.

FIG. 12 and FIG. 13 are flowchart diagrams of generation processing for verification information in the verification information generation device 32 in the electronic mail transmitting terminal 3. In addition, FIG. 14 is a diagram illustrating an example of processing for the generation and addition of verification information when an internal transmission generation key (internal transmission secret key information) is used. FIG. 15 is a diagram illustrating an example of processing for the generation and addition of verification information when an external transmission generation key (external transmission secret key information) is used.

In FIG. 12, the sender X starts up the electronic mail software 31 using the electronic mail transmitting terminal 3, and creates an outgoing electronic mail. After creating the electronic mail, the electronic mail software 31 issues a request to generate verification information, to the verification information generation device 32 serving as a mail checker, and outputs an outgoing electronic mail including header information and body text information.

In response to this, the verification information generation device 32 receives the request to generate verification information from the electronic mail software 31 through the input-output unit 3211 in the demand reception mechanism 321. In addition, the demand reception mechanism 321 issues a request to generate verification information to the verification information generation mechanism 324 (S4001). At this time, the outgoing electronic mail that has been received from the electronic mail software 31 and includes the header information and the body text information is output to the verification information generation mechanism 324.

In response to this, the verification information generation mechanism 324 receives the request to generate verification information (S4002), and outputs a request to acquire a generation key to the generation key management mechanism 323 (S4003). At this time, the header information of the outgoing mail is output so that the generation key management mechanism 323 determines whether internal transmission or external transmission.

In response to this, the generation key management mechanism 323 receives the request to acquire a generation key (S4004). Next, the verification information generation method determination unit 3231 within the generation key management mechanism 323 analyzes the header information of the outgoing mail (S4005).

Specifically, the To: header of the header information of the outgoing mail, illustrated in FIG. 14 and FIG. 15, is confirmed, and it is determined whether the internal transmission or the external transmission (S4006). In the case of the internal transmission in FIG. 14, owing to a domain (inter.system.com) following "@" in "kimura@inter.system.com" in the To: header, it may be possible to determine the internal transmission, and in the case of the external transmission in FIG. 15, owing to a domain (extra.tech.com) following "@" in "satoh@extra.tech.com" in the To: header, it may be possible to determine the external transmission. In other words, it is based on the assumption that the verification information generation method determination unit 3231 knows the information of the domain of the mail address of the sender X. In the case of not knowing, if both of the domains of the headers of From and To coincide with each other, the internal transmission is determined, and if both of the domains of the headers of From and To do not coincide with each other, the external transmission is determined.

When the determination due to the verification information generation method determination unit 3231 corresponds to the internal transmission, the verification information generation key storage unit 3233 acquires the internal transmission secret key information (S4007-IN), and outputs the internal transmission secret key information to the verification information generation mechanism 324 (S4008). On the other hand, in the case of the external transmission, the verification information generation key storage unit 3233 acquires an external transmission key pair (the secret key information and the public key information) (S4007-OUT), and outputs the external transmission key pair to the verification information generation mechanism 324 (S4008).

In response to this, the verification information generation mechanism 324 inputs the generation key (S4009), and subsequently, outputs, to the management mechanism 322, a request to acquire a characteristic amount target item (S4010).

The management mechanism 322 inputs the request to acquire a characteristic amount target item (S4011), and acquires a characteristic amount target item from the characteristic amount target item management unit 3221 (S4012). An acquisition method is as illustrated in the above description. In addition, the management mechanism 322 outputs the characteristic amount target item to the verification information generation mechanism 324 (S4013).

After acquiring the characteristic amount target item (S4014), the verification information generation mechanism 324 generates characteristic amount information using the information of the characteristic amount target item, as illustrated in FIG. 13 (S4015).

The generation of the characteristic amount information is specifically illustrated in FIG. 14 and FIG. 15. The characteristic amount information generation unit 3241 generates the characteristic amount information with respect to four items including the From: header, the Subject: header, and the Date: header of the header information and the Body: body text information of the outgoing mail (S4015). In FIG. 14 of the internal transmission, it is indicated that "482DCBA724" has been generated as the characteristic amount information. In FIG. 15 of the external transmission, it is indicated that "23104AFC46" has been generated as the characteristic amount information.

This characteristic amount information corresponds to, for example, hash information generated using a one-way hash function. Owing to this, the characteristic amount information becomes digest information having a relatively short fixed size, and it may be possible to easily perform encryption processing utilizing secret key information. In this regard, however, a characteristic amount generation method may also be used that is based on a generation algorithm other than the one-way hash function. It is desirable that the verification device 32 on the transmitting side shares the function based on this generation algorithm, with the characteristic amount information generation units 6231 and 9221 in the verification devices 62 and 92 on the receiving side so as to secure consistency at the time of verification.

In addition, while, in the present embodiment, the characteristic amount information is generated with respect to the characteristic amount target item using the hash function, the characteristic amount target information including the information of the characteristic amount target item without change may also be used as the characteristic amount information as illustrated by dashed line arrows in FIG. 14 and FIG. 15. In this regard, however, when the latter is selected, compared with the former, there is the possibility that the verification information is fabricated by an attacker. Accordingly, it is desirable that, in the same way as the former, the transmitting side and the receiving side secretly share a generation algorithm such as the hash function with each other and the characteristic amount information is generated from the information of the characteristic amount target item owing to the generation algorithm.

When the generation of the characteristic amount information has been completed, the verification information generation mechanism 324 generates verification information (S4016). Specifically, the secret key information of a generation key is acquired from the verification information generation key storage unit 3233, and encryption processing is performed using the secret key information.

In the case of the internal transmission, as illustrated in FIG. 14, the verification information generation unit 3242 subjects the characteristic amount information to encryption processing using the internal transmission secret key information, and generates the verification information. In FIG. 14, it is indicated that "BC73DA1254231C" has been generated as the verification information.

In the case of the external transmission, as illustrated in FIG. 15, the verification information generation unit 3242 subjects the characteristic amount information to encryption processing using the external transmission secret key information, and generates the verification information. In FIG. 15, it is indicated that "AF7D021BC81B43" has been generated as the verification information.

Next, the verification information addition unit 3243 adds the verification information to the header information of the outgoing mail, as new header information (S4017). Furthermore, the verification information addition unit 3243 also adds the characteristic amount target item to the header information of the outgoing mail, as new header information (S4018). The characteristic amount target item is information desired for performing verification at the time of receiving a mail, and the characteristic amount information is generated from the information of the characteristic amount target item added to the header information, at the time of receiving the mail in the same way as at the time of transmitting the mail. Accordingly, by adding the characteristic amount target item to the header information of the outgoing mail, it may be possible for the mail checker in the receiving terminal to generate the characteristic amount information.

In the examples in FIG. 14 and FIG. 15, the From, the Subject, the Date, and the Body, which directly indicate the characteristic amount target items, are added to the header information. However, encryption information corresponding to the characteristic amount target item, for example, characteristic amount target item information such as the rank of the degree of importance, which corresponds to the characteristic amount target item, may also be added to the header information. In such a case, security is enhanced.

In FIG. 14 of the internal transmission, as new header information relating to the characteristic amount target item, an X-Inbound-TargetHead: header is generated, and "From, Subject, Date, Body" to be the characteristic amount target items are added. In addition, as the header information of the verification information, an X-Inbound-MAC (message authentication code): header is generated, and "BC73DA1254231C" to be the verification information is added.

In the case of the external transmission (S4019: YES), in addition to the characteristic amount target items and the verification information, added to the internal transmission, the verification information addition unit 3243 adds the external transmission public key information corresponding to the encrypted external transmission secret key information, as information used for performing verification at the time of receiving a mail (S4020). In this regard, however, the external transmission public key information may also be bulletined in an Internet site open to public inspection, and, in that case, may not be added to the header information.

In FIG. 15 of the external transmission, as the new header information of the external transmission public key information, an X-Inbound-PKey (public key): header is generated, and "4BCD781A23913A" to be the external transmission public key information is added.

The verification information addition unit 3243 may also add, as the header information, encryption information indicating a generation algorithm such as a one-way hash function, used for generating a characteristic amount. In doing so, the transmitting side and the receiving side may not share the generation algorithm with each other.

Owing to the processing operations so far, the generation of the outgoing electronic mail including the verification information-added header information is completed. Therefore, the verification information generation mechanism 324 outputs verification information-added mail information to the demand reception mechanism 321 (S4021). When having input the verification information-added mail information (S4022), the demand reception mechanism 321 outputs the verification information-added mail information to the electronic mail software 31, and the electronic mail software 31 transmits an electronic mail to a recipient through the communication device 33. In the case of transmission to the recipient A, the electronic mail is transmitted through the outgoing mail (SMTP) server 4 on the way, and in the case of transmission to the recipient B, the electronic mail is transmitted through the outgoing mail (SMTP) server 7 on the way.

[Reception Processing for Electronic Mail]

Next, reception processing in the electronic mail receiving terminals 6 and 9 are described.

Figure 16:
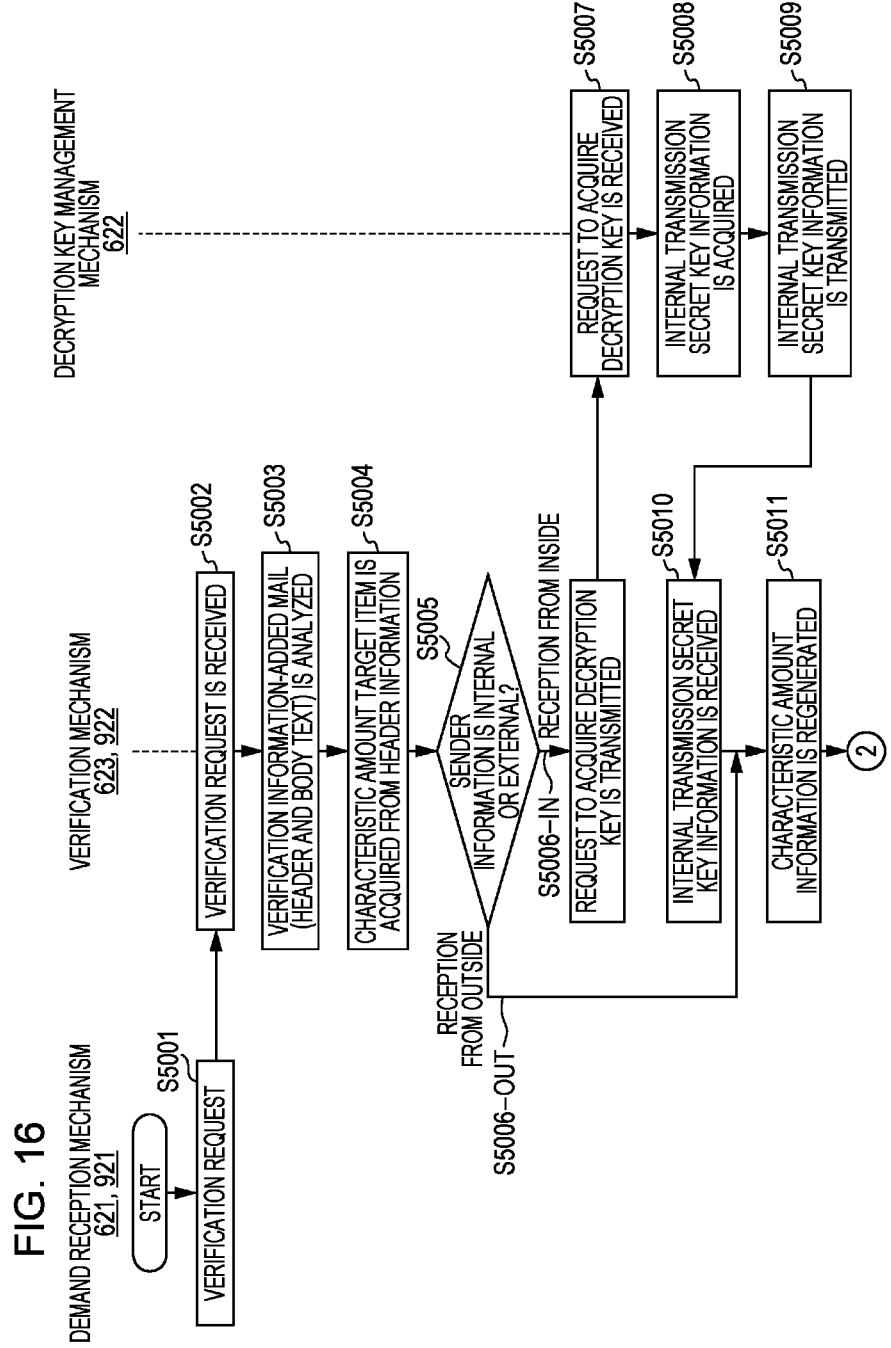
FIG. 16 is a flowchart diagram of verification processing for verification information in verification devices in individual electronic mail receiving terminals.
Figure 17:
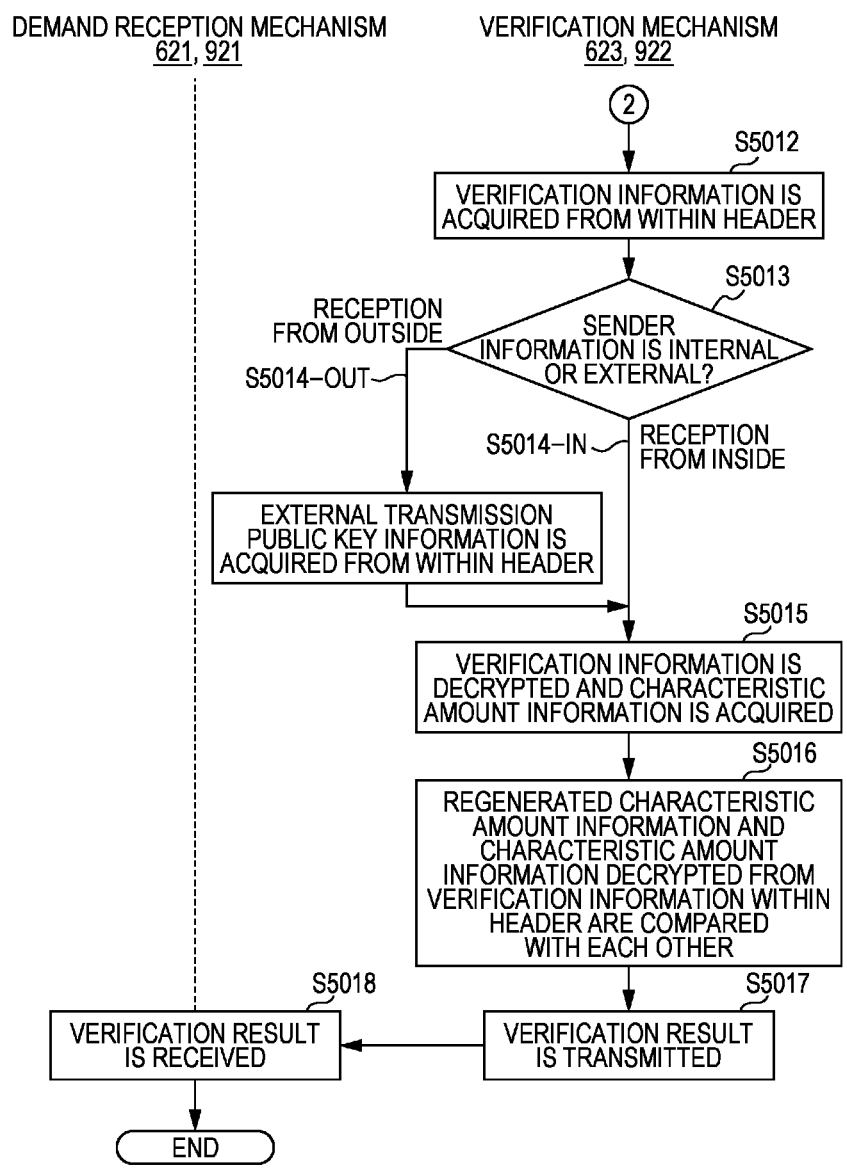
FIG. 17 is a flowchart diagram of verification processing for verification information in verification devices in individual electronic mail receiving terminals.
Figure 18:
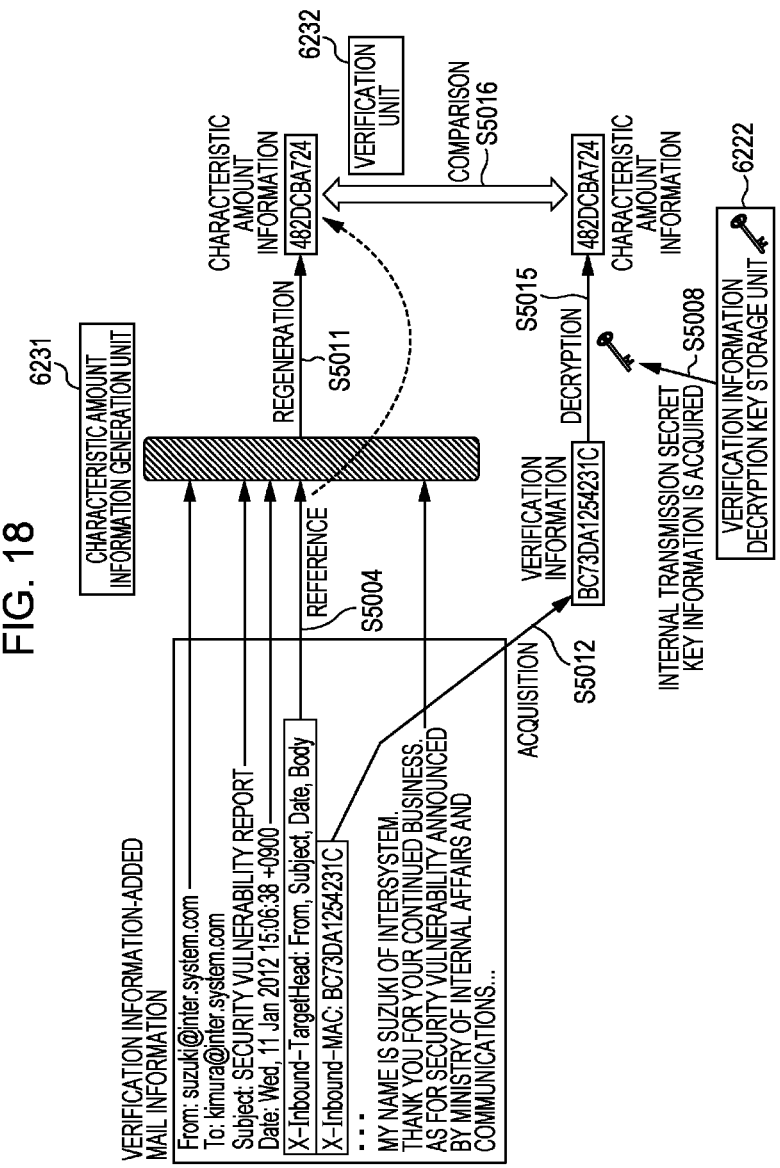
FIG. 18 is a diagram illustrating an example of verification processing when an internal generation key is used.
Figure 19:
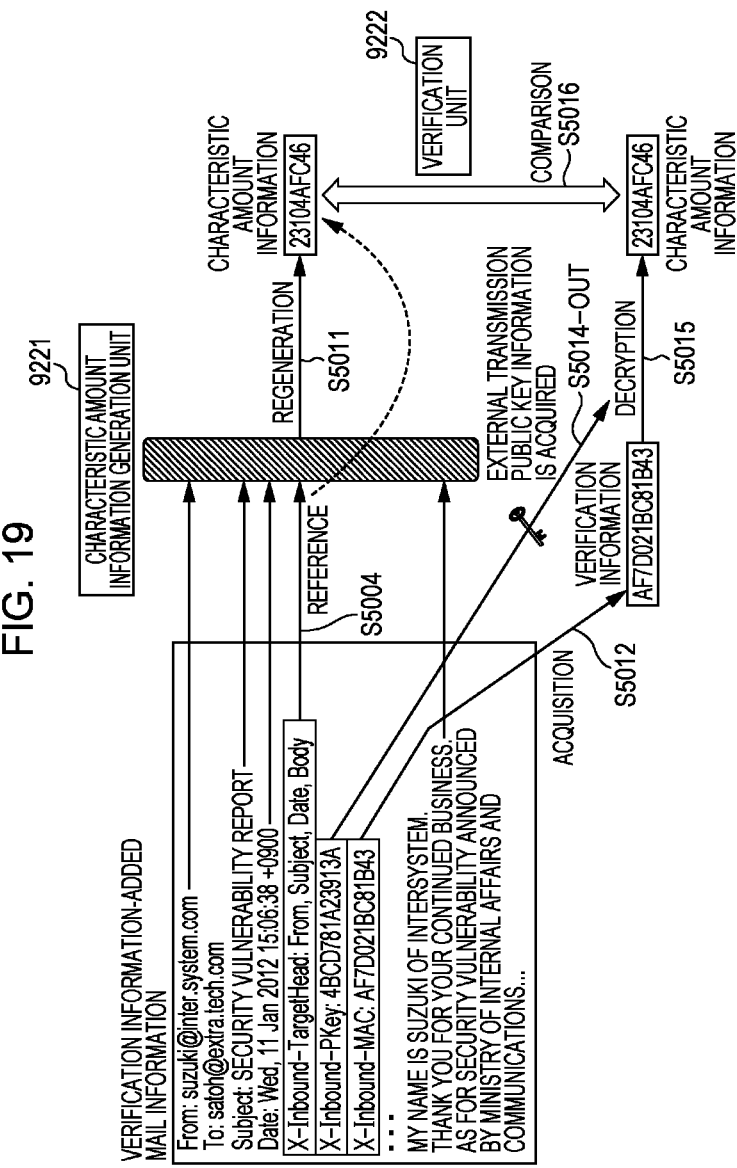
FIG. 19 is a diagram illustrating an example of verification processing when an external generation key is used.

FIG. 16 and FIG. 17 are flowchart diagrams of verification processing for verification information in the verification device 62 and the verification device 92 in the individual electronic mail receiving terminals 6 and 9. FIG. 18 is a diagram illustrating an example of verification processing when an internal generation key is used. FIG. 19 is a diagram illustrating an example of verification processing when an external generation key is used.

First, using FIG. 16, FIG. 17, and FIG. 18, the verification processing of the recipient A within the internal network at the time of reception is described. The recipient A starts up the electronic mail software 61 on the mail receiving terminal 6, and performs reception processing for an electronic mail. At this time, through the incoming mail (POP) server 5, a verification information-added mail is received.

In addition, the electronic mail software 61 issues a request to verify verification information to the verification device 62 serving as the mail checker, with adding the verification information-added mail to the request. Through the input-output unit 6211 in the demand reception mechanism 621, the verification device 62 receives the request to verify the verification information from the electronic mail software 61. In response to this, the demand reception mechanism 621 issues a verification request to the verification mechanism 623 (S5001). At this time, the verification information-added mail received from the electronic mail software 61 is provided to the verification mechanism 623.

The verification mechanism 623 inputs the verification request (S5002), and analyzes the header information and the body text information of the verification information-added mail (S5003). Subsequently, the verification mechanism 623 acquires a characteristic amount target item from the header information (S5004).

Specifically, as illustrated in FIG. 18, by referring to an X-Inbound-TargetHead: header corresponding to the characteristic amount target item, it is confirmed which item is the generation target of the characteristic amount information. In the present embodiment, as described in the processing at the time of transmission, it means that the characteristic amount information is generated with respect to four items including the From: header, the Subject: header, the Date: header, and the Body: body text information. In addition, as described later, the characteristic amount information generation unit 6231 extracts the characteristic amount target item from the received electronic mail, and regenerates the characteristic amount information owing to the function of a generation algorithm (S5011).

After having acquired the characteristic amount target item, the verification mechanism 623 determines whether reception from the internal network or reception from the external network (S5005). This determination may be performed from, for example, a domain following "@" in a mail address described in the FROM: header of an incoming mail. In the example of FIG. 18, reception from the internal network is determined. Therefore, the verification mechanism 623 outputs, to the decryption key management mechanism 622, a request to acquire a decryption key (internal transmission secret key information) (S5006-IN).

In response to this, the decryption key management mechanism 622 inputs the request to acquire a decryption key (S5007). In addition, the decryption key management mechanism 622 acquires the internal transmission secret key information from the verification information decryption key storage unit 6222 (S5008), and outputs the internal transmission secret key information to the verification mechanism 623 (S5009). In response to this, the verification mechanism 623 inputs the internal transmission secret key information (S5010).

When the characteristic amount target item and the decryption key have been completed, the verification mechanism 623 regenerates the characteristic amount information using the information of the characteristic amount target item (S5011). Specifically, as illustrated in FIG. 18, using the same generation algorithm as the transmitting side, such as a one-way hash function, the characteristic amount information generation unit 6231 regenerates the characteristic amount information, with respect to the information of four items including the From: header, the Subject: header, and the Date: header of the header information and the Body: body text information. In FIG. 18, "482DCBA724" has been generated as the characteristic amount information.

When the above-mentioned characteristic amount information is regenerated, in a case where function correspondence information corresponding to the function of a characteristic amount generation algorithm is added to the header of the incoming mail, the characteristic amount information generation unit 6231 refers to that, and generates the characteristic amount information from the characteristic amount target item using a corresponding function.

In addition, when the above-mentioned characteristic amount information is regenerated, in a case where the characteristic amount target item information serving as encryption information corresponding to the characteristic amount target item is added to the header of the incoming mail, a characteristic amount target item corresponding to the characteristic amount target item information is acquired from the list of characteristic amount target items in FIG. 11, and the characteristic amount information is generated from the characteristic amount target item owing to the characteristic amount generation algorithm.

Furthermore, when the above-mentioned characteristic amount information is regenerated, in a case where the characteristic amount target information of the information itself of the characteristic amount target item is utilized, as the characteristic amount information, on the transmitting side without being subjected to an operation due to the one-way hash function, the characteristic amount target information of the information itself of the characteristic amount target item is also utilized, as the characteristic amount information, on the receiving side in the same way, as illustrated by a dashed line arrow in FIG. 18.

Subsequently, the verification mechanism 623 acquires the verification information added to the header information (S5012). For example, as illustrated in FIG. 18, by referring to an X-Inbound-MAC: header, "BC73DA1254231C" serving as the verification information is acquired.

In addition, in the example in FIG. 18, since in the case of reception from the internal network (S5014-IN), the verification mechanism 623 decrypts the verification information using internal transmission secret information acquired from the decryption key management mechanism 622, and acquires the characteristic amount information (S5015). As illustrated in FIG. 18, "482DCBA724" has been generated as a decryption result.

When the decryption of the verification information has been completed, the verification mechanism 623 compares the decrypted characteristic amount information with the regenerated characteristic amount information, and confirms whether or not the decrypted characteristic amount information and the regenerated characteristic amount information coincide with each other (S5016). In addition, the verification mechanism 623 outputs the result of comparison and confirmation to the demand reception mechanism 621 (S5017).

When having received a verification result (S5018), the demand reception mechanism 621 outputs the verification result to the electronic mail software 61, and the recipient A is notified of the verification result through the output device 64.

In the example of FIG. 18, since the regenerated characteristic amount information, "482DCBA724", and the decrypted characteristic amount information, "482DCBA724", coincide with each other, an adequate incoming mail notice is given. On the other hand, when the regenerated characteristic amount information and the decrypted characteristic amount information do not coincide with each other, the recipient A is notified of a suspected fraudulent incoming mail such as a targeted attack electronic mail.

Next, using FIG. 16, FIG. 17, and FIG. 19, the verification processing of the recipient B within the external network at the time of reception is described. The recipient B starts up the electronic mail software 91 installed into the mail receiving terminal 9, and performs reception processing for an electronic mail. At this time, through the incoming mail (POP) server 8, a verification information-added mail is received.

After having received a request to receive an electronic mail, the electronic mail software 91 issues a request to verify verification information to the verification device 92, with adding the verification information-added mail to the request. Through the input-output unit 9211 in the demand reception mechanism 921, the verification device 92 receives the request to verify the verification information from the electronic mail software 91. In addition, the demand reception mechanism 921 issues a verification request to the verification mechanism 922 (S5001). At that time, the verification information-added mail received from the electronic mail software 91 is transmitted along with the verification request.

The verification mechanism 922 inputs the above-mentioned verification request (S5002), and analyzes the header information and the body text information of the verification information-added mail (S5003). In addition, the verification mechanism 922 acquires a characteristic amount target item from the header information of the verification information-added incoming mail (S5004).

Specifically, as illustrated in FIG. 19, by referring to an X-Inbound-TargetHead: header corresponding to the characteristic amount target item, it is confirmed which item is the generation target of the characteristic amount information. In the example of FIG. 19, the characteristic amount target items are the four items including the From: header, the Subject: header, the Date: header, and the Body: body text information, and it means that the characteristic amount information is generated from these items.

After having acquired the characteristic amount target item, the verification mechanism 922 determines whether reception from the internal network or reception from the external network (S5005). This determination may be performed from, for example, a domain following "@" in a mail address described in the FROM: header of the verification information-added incoming mail. In the example of FIG. 19, reception from the external network is determined (S5006-OUT), and since the decryption key is stored in the header information, no acquisition request is issued to the decryption key management mechanism.

When the characteristic amount target item and the decryption key have been completed, the verification mechanism 922 regenerates the characteristic amount information using the information of the characteristic amount target item (S5011). Specifically, as illustrated in FIG. 19, owing to a predetermined generation algorithm shared with the transmitting side, for example, a one-way hash function, the characteristic amount information generation unit 9221 regenerates the characteristic amount information, from information with respect to four items including the From: header, the Subject: header, and the Date: header of the header information and the Body: body text information. In FIG. 19, "23104AFC46" has been generated as the characteristic amount information.

Next, the verification mechanism 922 acquires the verification information added to the header information (S5012). As illustrated in FIG. 19, by referring to an X-Inbound-MAC: header, "AF7D021BC81B43" serving as the added verification information is acquired.

Since in the case of reception from the external network, the verification mechanism 922 acquires the external transmission public key information added to the header information (S5014-OUT). Specifically, as illustrated in FIG. 19, by referring to an X-Inbound-PKey: header, "4BCD781A23913A" is acquired. Using this external transmission public key information, the verification information is decrypted, and the characteristic amount information is acquired (S5015). As illustrated in FIG. 19, "23104AFC46" has been generated as a decryption result.

When the decryption of the verification information has been completed, the verification mechanism 922 compares the decrypted characteristic amount information with the regenerated characteristic amount information, and confirms whether or not the decrypted characteristic amount information and the regenerated characteristic amount information coincide with each other (S5016). In addition, the result of comparison and confirmation is output to the demand reception mechanism 921 (S5017).

When having received a verification result (S5018), the demand reception mechanism 921 outputs the verification result to the electronic mail software 91, and the recipient B is notified of the verification result through the output device 94.

In the same way as in the case of being transmitted to the internal network, in the receiving terminal for an electronic mail transmitted to the external network, the following example of a modification may also be available in the reproduction of the characteristic amount information.

First, when the above-mentioned characteristic amount information is regenerated, in a case where function correspondence information corresponding to the function of a characteristic amount generation algorithm is added to the header of the incoming mail, the characteristic amount information generation unit 9221 refers to that, and generates the characteristic amount information from the information the characteristic amount target item using a corresponding function.

In addition, when the above-mentioned characteristic amount information is regenerated, in a case where the characteristic amount target item information serving as encryption information corresponding to the characteristic amount target item is added to the header of the incoming mail, a characteristic amount target item corresponding to the characteristic amount target item information is acquired from the list of characteristic amount target items in FIG. 11, and the characteristic amount information is generated from the information of the characteristic amount target item owing to the characteristic amount generation algorithm.

Furthermore, when the above-mentioned characteristic amount information is regenerated, in a case where the characteristic amount target information of the characteristic amount target item itself is utilized, as the characteristic amount information, on the transmitting side without being subjected to an operation due to the one-way hash function, the characteristic amount target information of the characteristic amount target item itself is also utilized, as the characteristic amount information, on the receiving side in the same way, as illustrated by a dashed line arrow in FIG. 19.

In addition, even if the external transmission public key information is not added to the header of the incoming mail, it may be possible to perform decryption processing by acquiring that external transmission public key information from a predetermined Internet site providing the external transmission public key information.

In the receiving terminal for an electronic mail transmitted to the external network, encryption and decryption are performed using a pair of the external transmission secret key information and the public key information. Accordingly, there is no assurance that the public key information is not generated by a third person. Therefore, the verification mechanism 922 may also perform processing for requesting an authentication business operator to authenticate the external transmission public key information added to the incoming mail and receiving an authentication result. The authentication business operator registers the external transmission secret key information and the public key information, and authenticates that secret key information corresponding to the requested public key information is not fraudulent secret key information, namely, is a key due to a legitimate sender. Owing to this, even if a fraudulent third person has personally generated the external transmission secret key information and the public key information and transmitted an authentication information-added electronic mail using these, it may be detected owing to authentication processing due to a public key authentication business operator.

In addition, even if a verification information-added electronic mail has been received owing to the external transmission secret key information and the public key information the fraudulent third person has generated, if a generation algorithm for generating the characteristic amount information is secretly maintained, the regenerated characteristic amount information and the decrypted characteristic amount information do not coincide with each other. Therefore, it may be possible to detect that the verification information-added electronic mail is an electronic mail due to the fraudulent third person.

[Example of Broadcast Electronic Mail to Internal and External Networks]

In the present embodiment, it may also be possible for the sender X to transmit a broadcast mail (a mail where internal transmission and external transmission are mixed) to the recipient A and the recipient B. In that case, the mail checker in the transmitting terminal performs both of the processing in the case of the internal network and the processing in the case of the external network, which are described above. In addition to this, the mail checker in the receiving terminal performs the above-mentioned reception processing to perform verification if within the internal network, and the mail checker in the receiving terminal performs the above-mentioned reception processing to perform verification if within the external network.

As described above, according to the present embodiment, without using an SPF/Sender ID or a DKIM, realized on a server basis, it may be possible to detect a fraudulent mail such as a targeted attack mail, on a client basis. Specifically, using the internal transmission secret key information or the external transmission secret key information, the verification information is generated that includes the header information or the body text information, and verification is performed. Therefore, as long as these pieces of information to be secret are not leaked to an attacker, it is difficult to fabricate the header information and generate the verification information. Accordingly, as for a mail to which the verification information is added and where it may not be possible to correctly perform verification, it may be possible to determine that there is the possibility of being a targeted attack mail, and owing to this detection, it may become possible to reduce the reception probability of a targeted attack mail.

Second Embodiment

In the first embodiment, the verification information generation device 32 serving as the mail checker program on the transmitting side extracts the information of a characteristic amount target item on the basis of the characteristic amount target item information, generates the characteristic amount information from that information using a one-way hash function, and generates the verification information by encrypting that characteristic amount information using the encryption key information. In addition, the verification device 62 or 92 serving as the receiving-side mail checker program extracts the information of the characteristic amount target item on the basis of the characteristic amount target item information, generates the characteristic amount information from that information using a one-way hash function, generates the decryption characteristic amount information by decrypting the received verification information using the encryption key information, compares both of the pieces of characteristic amount information, and checks whether or not an adequate incoming mail.

Accordingly, it is desirable that encryption algorithms, characteristic amount information generation algorithms (hash functions), pieces of encryption key information (pieces of internal transmission secret key information), and verification information generation algorithms for pieces of characteristic amount target item information individually coincide with each other between mail checker programs installed into a transmitting side and a receiving side. In addition, if these pieces of information are leaked and available to a fraudulent attacker, it may become difficult to block a spoofed mail having verification information due to the fraudulent attacker. Therefore, it is desirable that all pieces or some pieces of information desired for the generation of the above-mentioned verification information are occasionally updated.

However, when such a verification information generation algorithm as described above is periodically updated, a case occurs where the verification information generation algorithm is different between the transmitting terminal and the receiving terminal. For example, a case is cited where, owing to a long-term overseas business trip or the like, update processing was not performed. When the verification information generation algorithm is different, it is difficult for a mail checker program to discriminate a case where verification information generation algorithms have coincided with each other and verification has failed owing to the falsification of a target header item, from a case where verification has failed owing to the inconsistency of the verification information generation algorithm while a target header item has not been falsified.

Therefore, in a second embodiment, when all pieces or some pieces of information (a verification information generation algorithm) desired for the generation of the verification information have been updated, verification information generation algorithm version information is issued in response to this, and each mail checker program stores therein the version information. In addition, the version information is encrypted (alternatively, the characteristic amount information of the version information is encrypted) and attached to an outgoing mail. In addition to this, on the receiving side, checking and an alert warning, based on the verification information of an incoming mail, are performed under the condition that the version information of the incoming mail and the version information of a mail checker program on the receiving side coincide with each other. In other words, on the basis of the verification information generation algorithm version information, it is confirmed that the verification information generation algorithms coincide with each other between transmission and reception.

Figure 20:
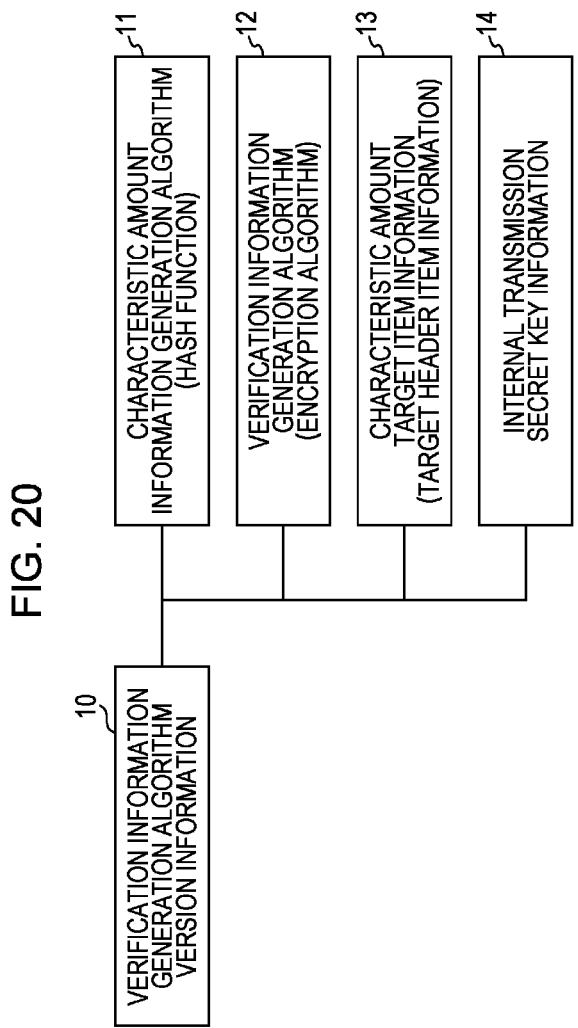
FIG. 20 is a diagram illustrating an example of verification information generation algorithm version information in a second embodiment.

FIG. 20 is a diagram illustrating an example of verification information generation algorithm version information in the second embodiment. In the first example, the verification information generation algorithm version information 10 is information for identifying the combination of a characteristic amount information generation algorithm 11 such as a hash function and an encryption algorithm 12 for encrypting the characteristic amount information and generating the verification information. In this regard, however, as described in the first embodiment, when the target header information is directly encrypted without generating the characteristic amount information owing to the hash function, the verification information generation algorithm version information 10 is information for identifying the encryption algorithm.

In addition, in a second example, the verification information generation algorithm version information 10 is information for identifying the combination of characteristic amount target item information (target header item information) 13 and internal transmission secret key information 14 in addition to the characteristic amount information generation algorithm 11 such as a hash function and the encryption algorithm 12 for encrypting the characteristic amount information and generating the verification information.

In the above-mentioned second example, if it may be possible to confirm the consistency of the version information, it may be possible to confirm the consistency of the characteristic amount target item information (target header item information) 13. Therefore, the characteristic amount target item information (target header item information) 13 may not be added to the header information of an outgoing mail in the same way as in the first embodiment.

Which of the first and second examples is selected is determined in response to which information is periodically updated in the mail checker program or not.

Figure 21:
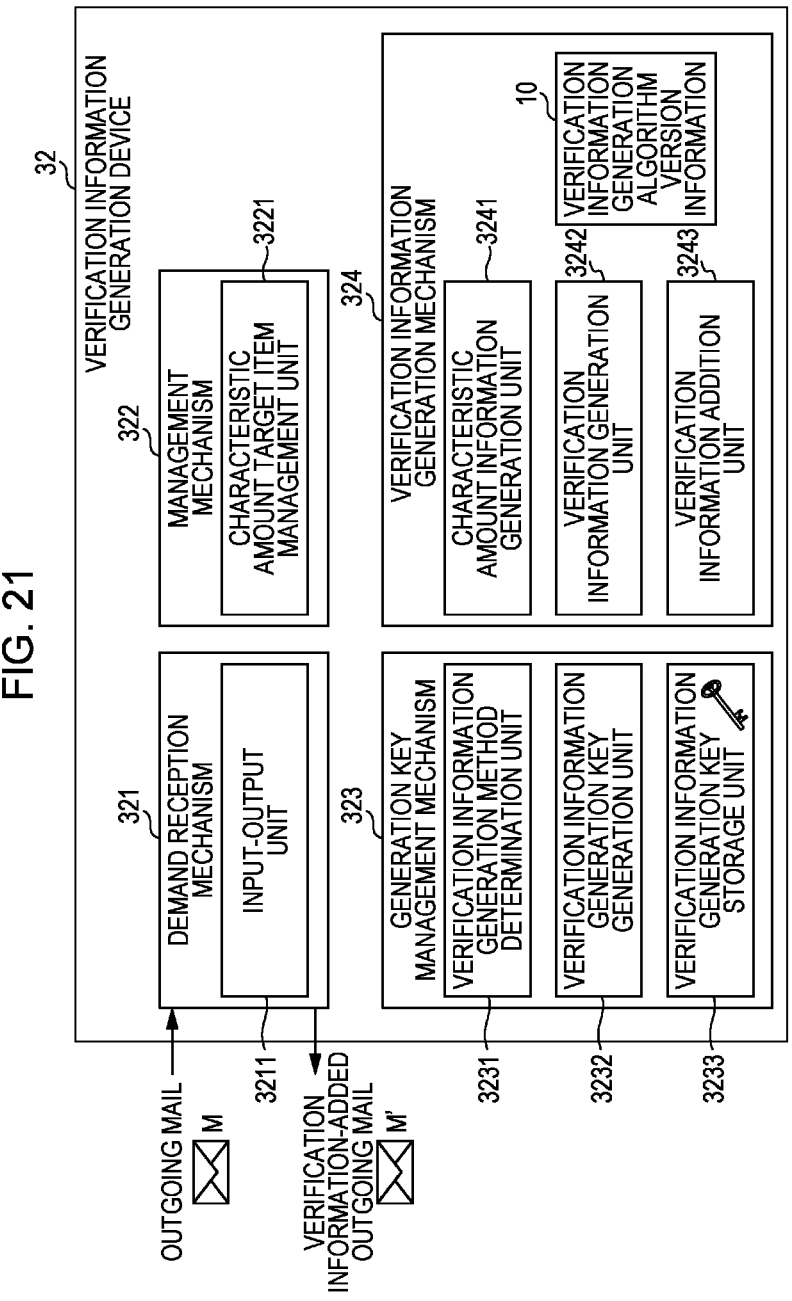
FIG. 21 is a configuration diagram of a verification information generation device within an electronic mail transmitting terminal in the second embodiment, and a diagram corresponding to FIG. 3 in the first embodiment.

FIG. 21 is the configuration diagram of a verification information generation device within the electronic mail transmitting terminal 3 in the second embodiment. FIG. 21 is a diagram corresponding to FIG. 3 in the first embodiment. In the verification information generation device 32 in FIG. 21, the verification information generation mechanism 324 stores therein the verification information generation algorithm version information 10, the characteristic amount information generation unit 3241 generates characteristic amount information (4) with respect to the version information, from the version information 10 using the one-way hash function, and the verification information generation unit 3242 encrypts, using an encryption key, the characteristic amount information (4) with respect to the version information and generates verification information (2) with respect to the version information. This is a configuration where the verification information generation device 32 in FIG. 21 is different from FIG. 3. The other configuration is the same as in FIG. 3.

As an example of a modification to the above description, the verification information generation device 32 may also directly encrypt the version information 10 using an encryption key and generate the verification information (2) with respect to the version information without generating the characteristic amount information (5) with respect to the version information.

Figure 22:
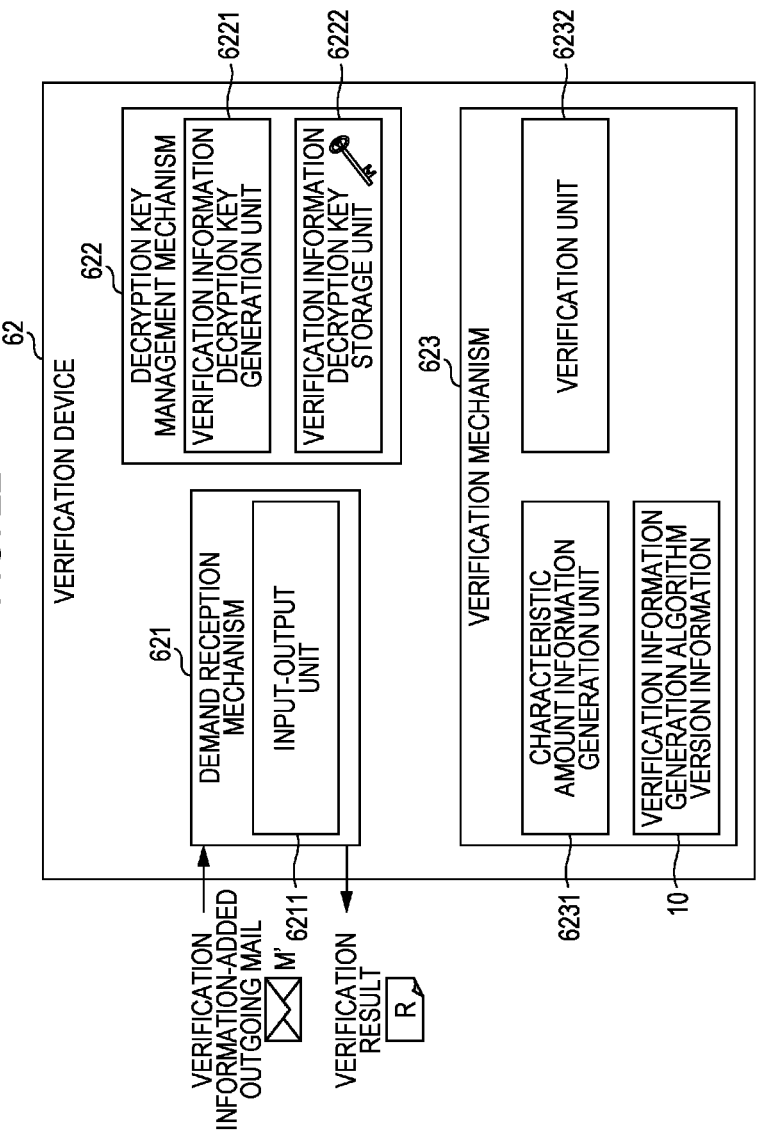
FIG. 22 is a configuration diagram of a verification device within an electronic mail receiving terminal in the second embodiment, and a diagram corresponding to FIG. 6 in the first embodiment.

FIG. 22 is the configuration diagram of the verification device 62 within the electronic mail receiving terminal 6 in the second embodiment. FIG. 22 is a diagram corresponding to FIG. 6 in the first embodiment. In the verification device 62 in FIG. 22, the verification mechanism 623 stores therein the verification information generation algorithm version information 10, and the characteristic amount information generation unit 6231 generates characteristic amount information (5) with respect to the version information, from the version information 10 using the one-way hash function. On the other hand, the verification unit 6232 decrypts verification information (2) with respect to the version information, added to an incoming mail, using a decryption key (internal transmission secret key), and generates characteristic amount information (6), compares both of the pieces of characteristic amount information (5) and (6) with each other, and checks whether or not the pieces of version information coincides with each other. This is a process where the verification device 62 in FIG. 22 is different from FIG. 3. The other process is the same as in FIG. 6.

As an example of a modification to the above description, when the version information is directly encrypted on the transmitting side using an encryption key and the verification information (2) with respect to the version information is generated, the verification device 62 on the receiving side also decrypts the verification information (2) with respect to the version information using a decryption key, generates the version information, and checks whether the version information coincides with the version information on the receiving side.

Figure 23:
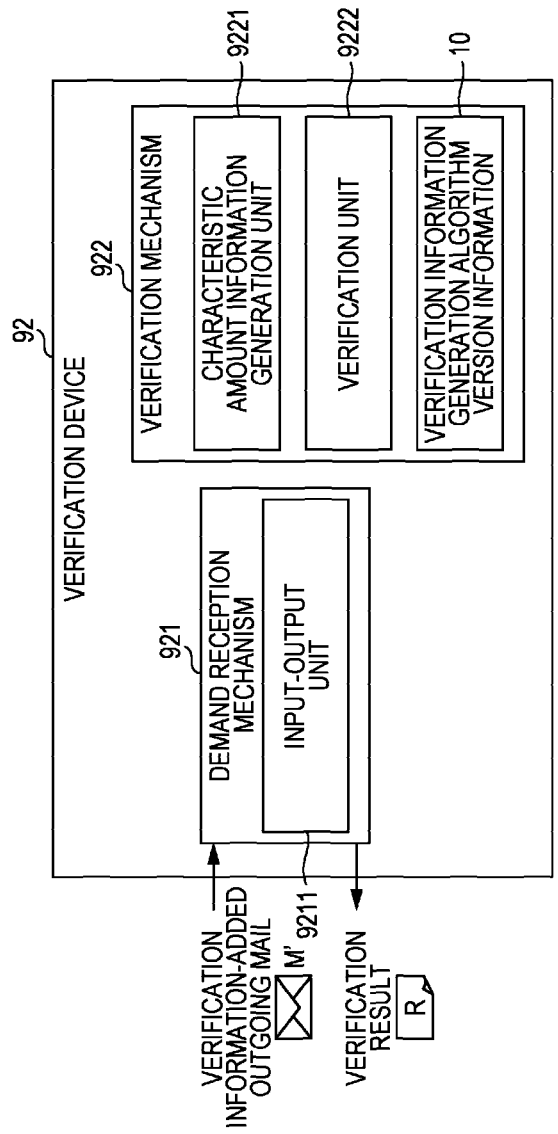
FIG. 23 is a configuration diagram of a verification device within an electronic mail receiving terminal in the second embodiment, and a diagram corresponding to FIG. 7 in the first embodiment.

FIG. 23 is the configuration diagram of the verification device 92 within the electronic mail receiving terminal 9 in the second embodiment. FIG. 23 is a diagram corresponding to FIG. 7 in the first embodiment. In the verification device 92 in FIG. 23, the verification mechanism 922 stores therein the verification information generation algorithm version information 10, and the characteristic amount information generation unit 9221 generates the characteristic amount information (5) with respect to the version information, from the version information 10 using the one-way hash function. On the other hand, the verification unit 9222 decrypts the verification information (2) with respect to the version information, added to an incoming mail, using a decryption key (external transmission secret key), and generates the characteristic amount information (6), compares both of the pieces of characteristic amount information (5) and (6) with each other, and checks whether or not the pieces of version information coincides with each other. This is a process where the verification device 92 in FIG. 23 is different from FIG. 7. The other process is the same as in FIG. 6.

As an example of a modification to the above description, when the version information is directly encrypted on the transmitting side using an encryption key and the verification information (2) with respect to the version information is generated, the verification device 92 on the receiving side also decrypts the verification information (2) with respect to the version information using a decryption key, generates the version information, and checks whether the version information coincides with the version information on the receiving side.

[Processing for Advance Preparation]

In the second embodiment, desired processing for advance preparation is the update of the characteristic amount information generation algorithm (hash function) or the encryption algorithm, managed by the verification information generation algorithm version information 10, and the storage of the verification information generation algorithm version information 10 associated with the update. In addition, in the second embodiment, the same advance preparation processing as in the first embodiment is also performed.

[Transmission Processing for Electronic Mail]

Figure 24:
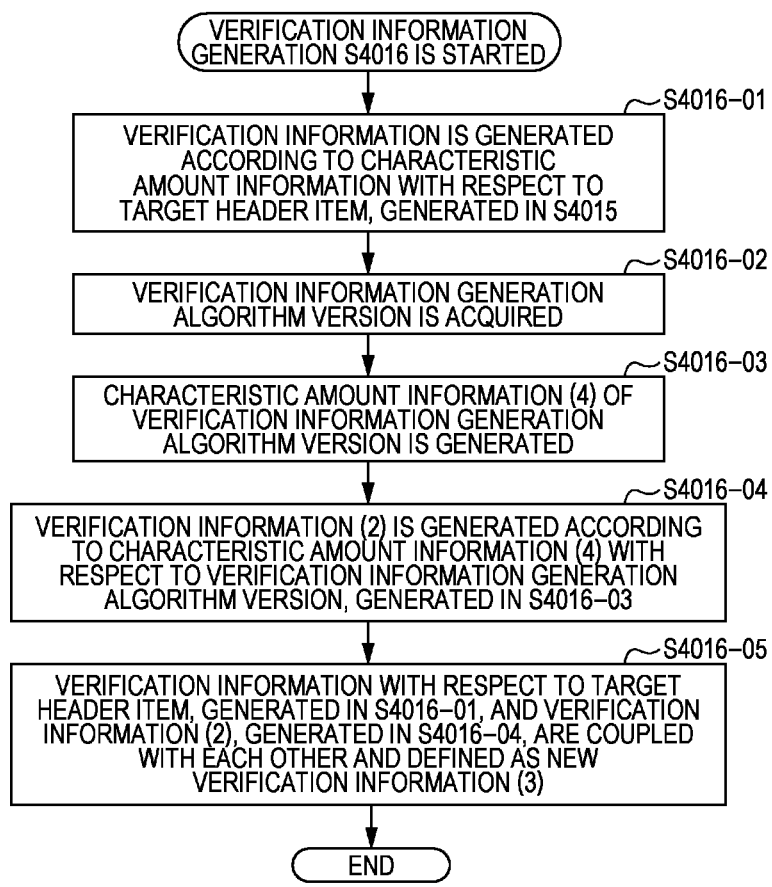
FIG. 24 is a flowchart diagram of a verification information generation process due to a verification information generation mechanism in a mail checker program within an electronic mail transmitting terminal in the second embodiment.

FIG. 24 is the flowchart diagram of a verification information generation process S4016 due to the verification information generation mechanism 324 in a mail checker program within an electronic mail transmitting terminal in the second embodiment. This verification information generation process S4016 is a processing process in the second embodiment in the verification information generation process S4016 in FIG. 13.

Figure 25:
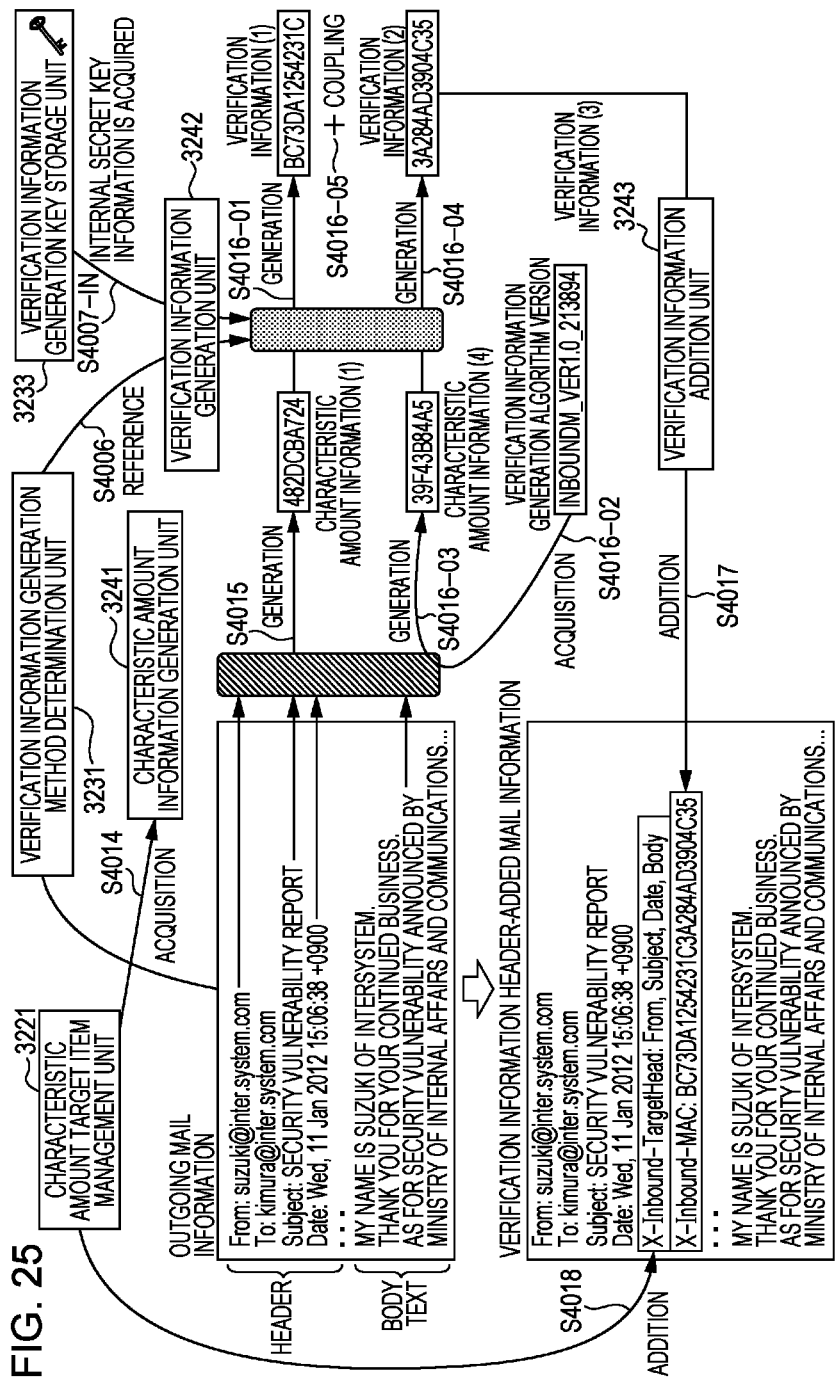
FIG. 25 is a diagram illustrating an example of processing for generation and addition of verification information when an internal transmission generation key (internal transmission secret key information) is used.

FIG. 25 is a diagram illustrating an example of processing for the generation and addition of verification information when an internal transmission generation key (internal transmission secret key information) is used.

Hereinafter, transmission processing for an electronic mail in the second embodiment is described with reference to FIG. 24 and FIG. 25.

As described in FIG. 13, the verification information generation mechanism 324 in the mail checker program within the electronic mail transmitting terminal performs the verification information generation process S4016 illustrated in FIG. 24 after the generation of the characteristic amount information (S4015) with respect to a target header item has been performed. First, the verification information generation unit 3242 encrypts the characteristic amount information with respect to the target header item, generated in the process S4015, and generates the verification information (S4016-01). This generation of the verification information is equivalent to the first embodiment.

Next, the verification information generation mechanism 324 in the mail checker program generates the characteristic amount information (4) with respect to the verification information generation algorithm version information 10, and generates the verification information (2) with respect to the version information by encrypting the characteristic amount information (4) (S4016-02 to S4016-05).

First, the verification information generation mechanism 324 in the mail checker program acquires the stored verification information generation algorithm version information 10 (S4016-02), and generates the characteristic amount information (4) corresponding to the version information (S4016-03). Specifically, as illustrated in FIG. 25, the characteristic amount information generation unit 3241 generates the characteristic amount information (4) with respect to the version information by carrying out an operation on the acquired verification information generation algorithm version information using a one-way hash function (S4016-03). In FIG. 25, "39F43B84A5" has been generated as the characteristic amount information (4) with respect to the version information.

Furthermore, the verification information generation unit 3242 encrypts the characteristic amount information (4) with respect to the version information, owing to internal secret information, and generates the verification information (2) with respect to the version information (S4016-04). In FIG. 25, "3A284AD3904C35" has been generated as the verification information (2) with respect to the version information. The above-mentioned internal secret information is the internal transmission secret key information in the case of transmission addressed to the inside, and the external transmission secret key information in the case of transmission addressed to the outside.

In addition, finally, the verification information generation unit 3242 couples the verification information (2) with respect to the version information, with the verification information with respect to the target header item, and generates new verification information (3) (S4016-05). In addition, in the same way as in FIG. 13, the verification information addition unit 3243 adds the coupled verification information (3) to the header information (S4017).

In FIG. 25, a header, "X-Inbound-MAC:", has been generated as the new header information of the verification information, and "BC73DA1254231C3A284AD3904C35" has been added as the coupled verification information (3). In this example, the verification information with respect to the target header item is anteriorly added, and the verification information (2) with respect to the version information is posteriorly added. However, this order may also be reversed.

As described above, it is desirable that the verification information (2) with respect to the version information is coupled with the verification information with respect to the target header item. Owing to coupling, in the verification information (3) added to the header information of an outgoing electronic mail, it may become difficult for an attacker to distinguish which portion is the verification information corresponding to a target header item and which portion is the verification information (2) corresponding to the version information, and it may be possible to improve security.

FIG. 25 illustrates an example of processing for the generation and addition of verification information when an internal transmission generation key (internal transmission secret key information) is used. However, in a case where an external transmission generation key (external transmission secret key information) is used, processing for generating the verification information (3) is also the same while an encryption key is just different.

[Reception Processing for Electronic Mail]

Next, verification processing in reception processing for an electronic mail will be described.

Figure 26:
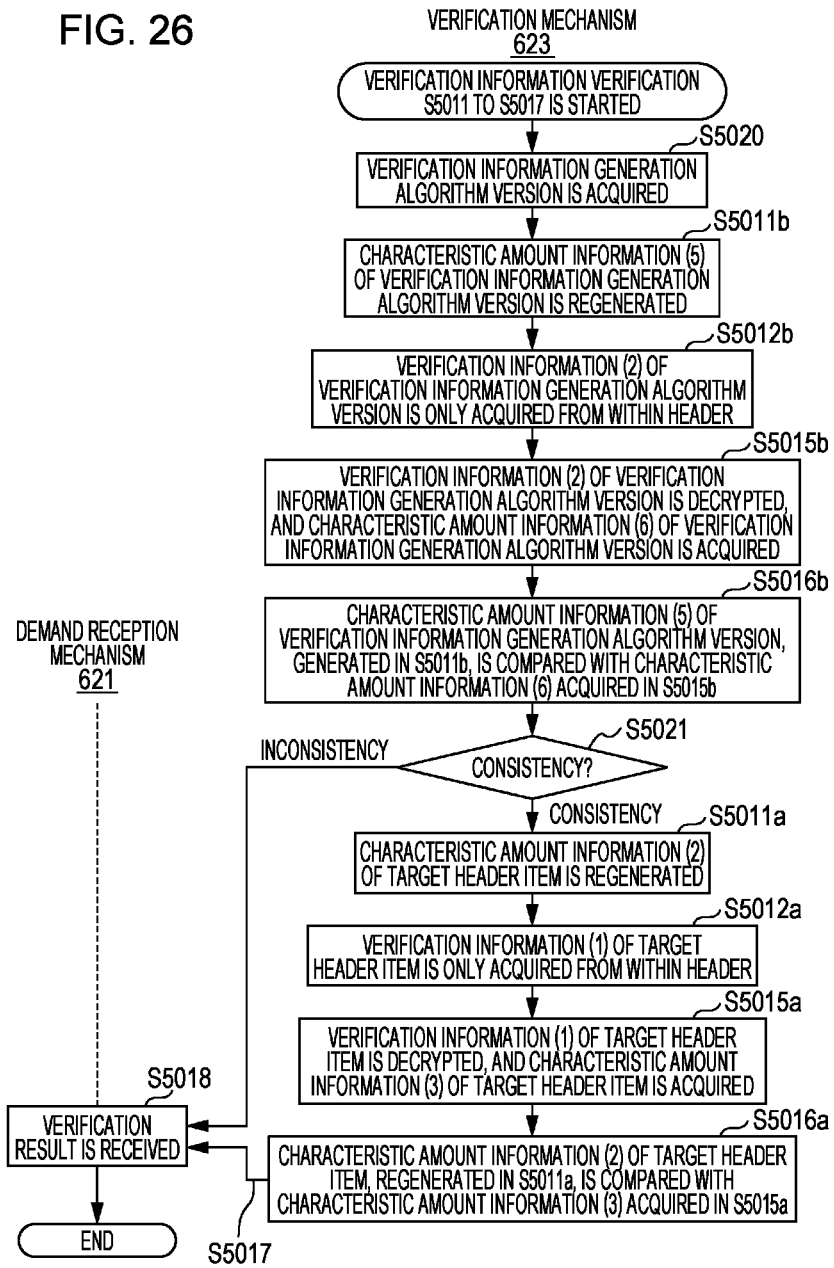
FIG. 26 is a flowchart diagram of verification information verification processes due to a verification mechanism in a mail checker program within an electronic mail receiving terminal in the second embodiment.

FIG. 26 is the flowchart diagram of verification information verification processes S5011-S5017 due to the verification mechanism 623 in a mail checker program within an electronic mail receiving terminal in the second embodiment. The verification processes are processing processes in the second embodiment in the verification information verification processes S5011-S5017 in FIG. 16 and FIG. 17.

Figure 27:
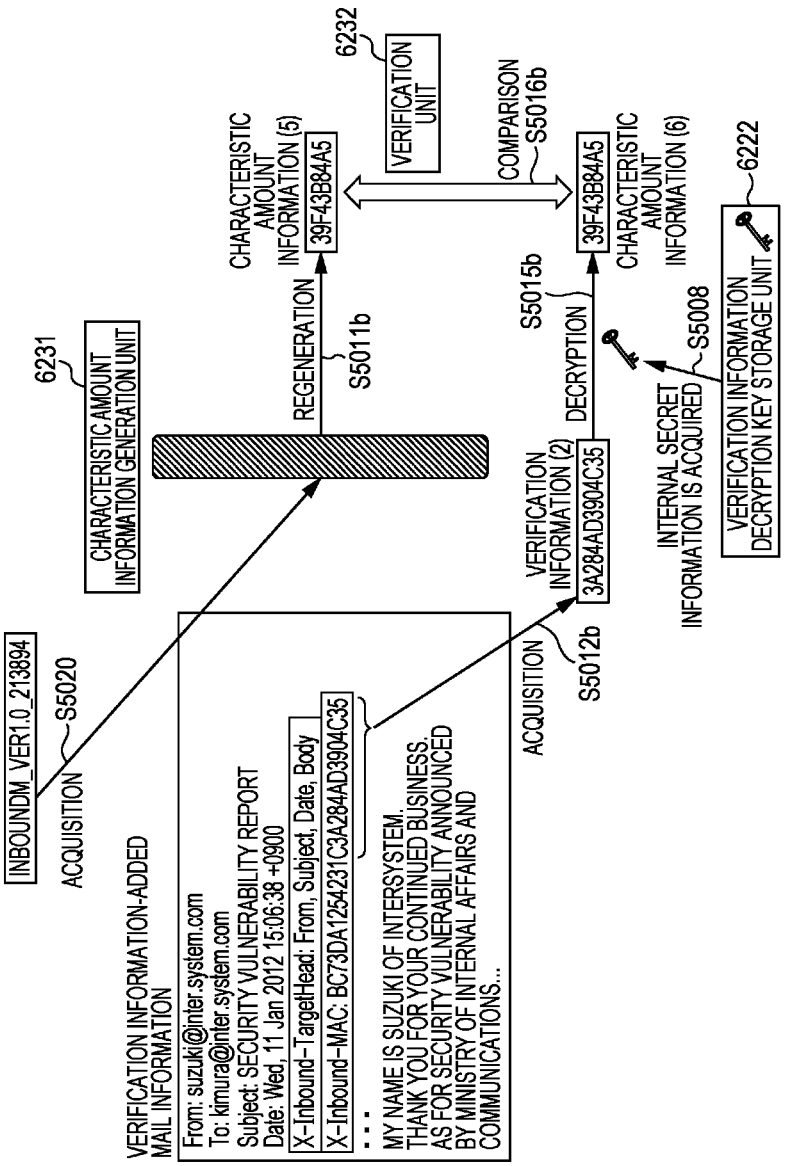
FIG. 27 is a diagram illustrating verification processing for verification information of verification information generation algorithm version information.
Figure 28:
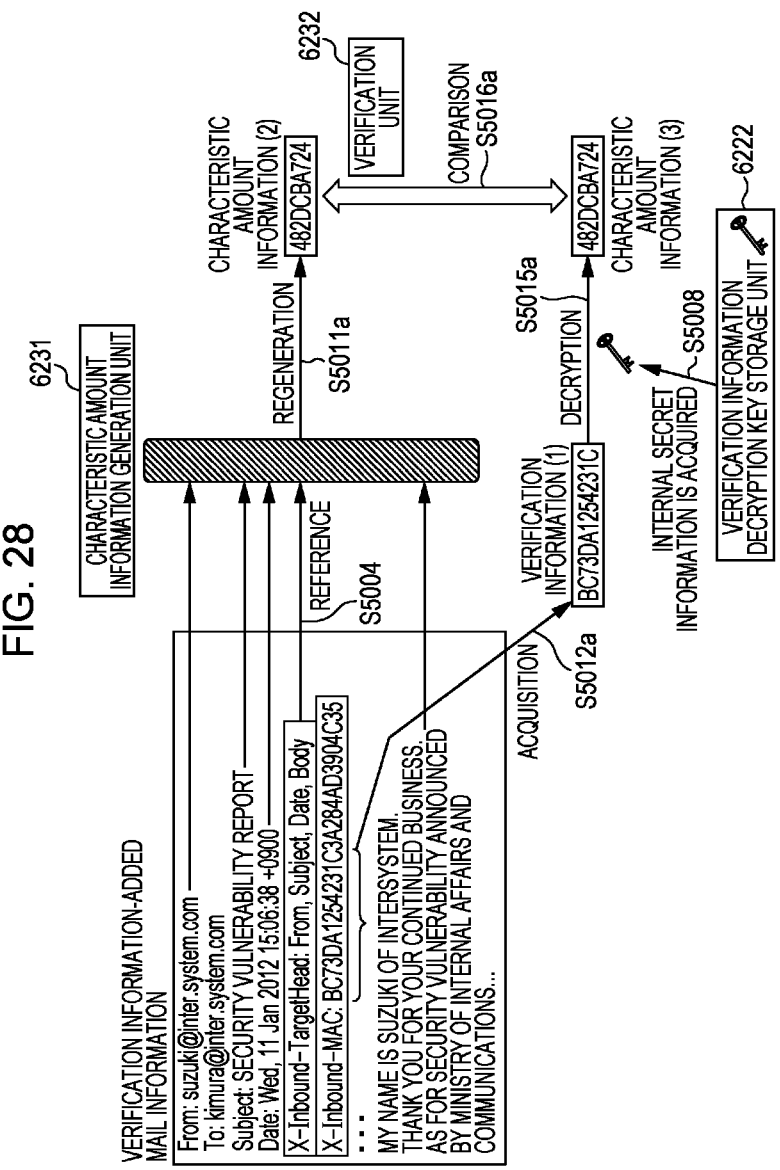
FIG. 28 is a diagram illustrating an example of verification processing for verification information of a target header item.

FIG. 27 is a diagram illustrating verification processing for the verification information (2) of the verification information generation algorithm version information. FIG. 28 is a diagram illustrating an example of verification processing for the verification information of a target header item. FIG. 27 and FIG. 28 are examples when the internal transmission secret key information is used, and diagrams corresponding to FIG. 18 in the first embodiment. In this regard, however, a case where the external transmission secret key information is used is also the same.

Hereinafter, reception processing for an electronic mail in the second embodiment is described with reference to FIG. 26, FIG. 27, and FIG. 28.

In FIG. 26, in the verification information verification processes due to the verification mechanism 623 in the mail checker program on the receiving side, verification processing for the verification information (2) with respect to the version information is performed, and it is checked whether or not pieces of version information coincide with each other. In addition, when the pieces of version information coincide with each other, verification processing for the verification information (1) of a target header item is performed. A result indicating that the pieces of version information do not coincide with each other or a result indicating one of the success and the failure of the verification information of a target header item while the pieces of version information coincide with each other is transmitted to the demand reception mechanism 621, as a verification result.

First, in the verification processing for the verification information (2) with respect to the version information, the characteristic amount information generation unit 6231 acquires the verification information generation algorithm version information stored within a verification device (S5020), and regenerates the characteristic amount information (5) with respect to the version information by carrying out an operation on the version information using a one-way hash function (S5011b). In FIG. 27, "39F43B84A5" has been regenerated as the characteristic amount information (5).

Next, the verification unit 6232 only acquires the verification information (2) with respect to the version information from the verification information (3) existing within the header information of an incoming mail (S5012b), and, using the internal transmission secret key information (decryption key information), and generates the characteristic amount information (6) with respect to the version information on the transmitting side by decrypting the verification information (2) (S5015b). In FIG. 27, "3A284AD3904C35" has been acquired that serves as the verification information (2) with respect to the version information serving as the posterior half of the coupled verification information (3), "BC73DA1254231C3A284AD3904C35", embedded in the header, "X-Inbound-MAC:", within the incoming mail, and "39F43B84A5" has been generated as the decrypted characteristic amount information (6).

In addition, the verification unit 6232 compares the characteristic amount information (5) with respect to the version information, generated in the process S5011b, and the characteristic amount information (6) with respect to the version information, decrypted in the process S5015b, with each other (S5016b). In addition, when the characteristic amount information (5) with respect to the version information and the characteristic amount information (6) with respect to the version information do not coincide with each other, the inconsistency of the version information is sent back to the demand reception mechanism 621 (S5021). When the characteristic amount information (5) with respect to the version information and the characteristic amount information (6) with respect to the version information coincide with each other, verification processing for the verification information of a subsequent target header item is performed.

In addition, in the case of an incoming mail from the outside, processing operations in the processes S5013 and S5014-OUT in FIG. 17, used for acquiring a public key corresponding to the external transmission secret key, are added to the above-mentioned processing.

Verification processing for the verification information of the target header item after the consistency of the version information has been confirmed is the same as the processing in FIG. 16 and FIG. 17, and the characteristic amount information generation unit 6231 regenerates the characteristic amount information (2) with respect to the target header item by referring to the target header item information within the incoming mail (S5011a). In FIG. 28, "482DCBA724" has been regenerated as the characteristic amount information (2) with respect to the target header item.

Next, the verification unit 6232 only acquires the verification information (1) of the target header item, from the coupled verification information (3) within the incoming mail (S5012a), and acquires the characteristic amount information (3) with respect to the target header item by decrypting the verification information (1) of the target header item using the internal secret information (S5015a). In FIG. 28, "482DCBA724" has been generated as the characteristic amount information (3) with respect to the decrypted target header item. Finally, the verification unit 6232 compares both of the pieces of characteristic amount information (2) and (3) with each other (S5016a), and sends back, to the demand reception mechanism 621, a verification result indicating the success of verification in the case of consistency or the failure of verification in the case of inconsistency (S5017).

In this way, according to the second embodiment, the verification information (2) with respect to the version information of the characteristic information generation algorithm is embedded in the header information of the outgoing mail on the transmitting side, and on the receiving side, on the basis of the verification information (2), it is confirmed whether or not the pieces of characteristic information generation algorithm version information of the mail checker programs on the transmitting side and the receiving side coincide with each other. Therefore, in addition to a verification success and a verification failure, it may also be possible to generate an inability to perform normal verification, which is due to the inconsistency of the version information.

In the above-mentioned verification processing on the receiving side, in a case where, on the transmitting side, the version information has been directly encrypted and the verification information (2) with respect to the version information has been generated, the version information is generated by decrypting the verification information (2) with respect to the version information, and compared with the version information stored on the receiving side, in the verification processing.

Figure 29:
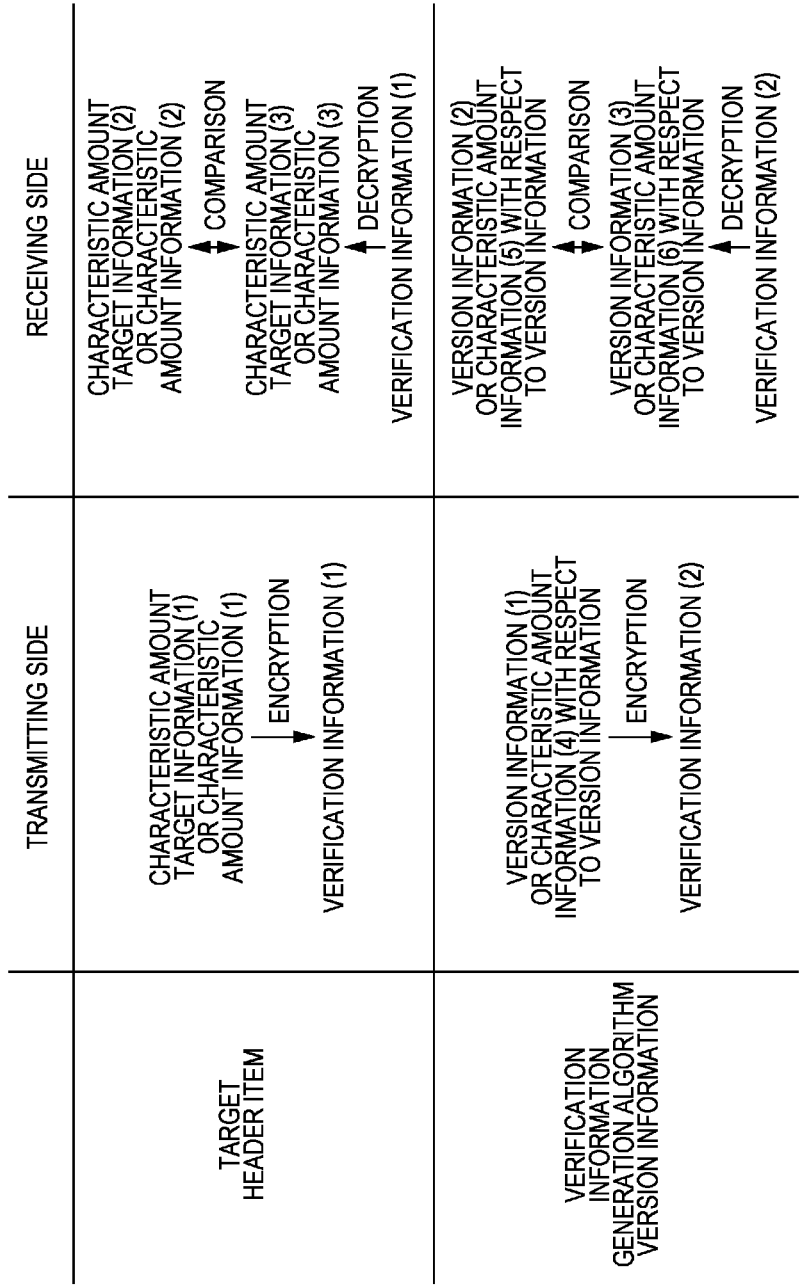
FIG. 29 is a diagram illustrating characteristic amount information and verification information, generated on a transmitting side, and characteristic amount information and verification information, generated on a receiving side, in the second embodiment.

FIG. 29 is a diagram illustrating characteristic amount information and verification information, generated on a transmitting side, and characteristic amount information and verification information, generated on a receiving side, in the second embodiment. For the sake of facilitating understanding, the characteristic amount information and the verification information with respect to the target header item information and the characteristic amount information and the verification information with respect to the version information, on each of the transmitting side and the receiving side, are described with reference to FIG. 29.

As for the target header item information, the mail checker program on the transmitting side generates the characteristic amount target information (1) or the characteristic amount information (1) thereof, and generates the verification information (1) by encrypting that. Furthermore, as for the verification information generation algorithm version information, the mail checker program on the transmitting side generates the version information (1) or the characteristic amount information (4) with respect to the version information.

As for the target header item information, the mail checker program on the receiving side generates the characteristic amount target information (2) or the characteristic amount information (2) thereof, generates the characteristic amount target information (3) or the characteristic amount information (3) thereof by decrypting the verification information (1), and compares both thereof with each other. Furthermore, as for the verification information generation algorithm version information, the mail checker program on the receiving side generates the version information (2) or the characteristic amount information (5) with respect to the version information, generates the version information (3) or the characteristic amount information (6) thereof by decrypting the verification information (2), and compares both thereof with each other.

Third Embodiment

In the first embodiment, on the transmitting side, the characteristic amount target item information corresponding to the characteristic amount target item is added as the header information of an outgoing mail, and, on the receiving side, the characteristic amount information is regenerated by referring to the characteristic amount target item information within the header information of an incoming mail. However, when the periodic update of the characteristic amount target item is not performed in the mail checker program, the update being set in a uniform manner, the characteristic amount target item information (target header item information) may not be added as the header information of an outgoing mail.

Therefore, in a third embodiment, the characteristic amount target item information is not added as the header information of an outgoing mail.

In the second embodiment, when the characteristic amount target item information (target header item information) is included in the verification information generation algorithm version information 10, the consistency or inconsistency of the characteristic amount target item between transmission and reception is verified in the verification process for the version information. Accordingly, in the second embodiment in which the version information is verified, the characteristic amount target item information (target header item information) may not be added as the header information of an outgoing mail.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A fraudulent mail detection method, executed by a computer in an electronic mail terminal device, the fraudulent mail detection method comprising:

preliminarily sharing internal transmission secret key information used in an electronic mail addressed to an internal network, between a transmitting terminal and a receiving terminal, and preliminarily generating external transmission secret key information used in an electronic mail addressed to an external network and external transmission public key information corresponding to the external transmission secret key information;

at a time of transmitting a mail, generating verification information by encrypting, using the internal transmission secret key information, first characteristic amount target information including a characteristic amount target item from among a header item, a body text, and attached information, included in an outgoing mail, or first characteristic amount information generated from the first characteristic amount target information on a basis of a predetermined function when a transmission destination of the outgoing mail is the internal network, and generating the verification information by encrypting, using the external transmission secret key information, the first characteristic amount target information or the first characteristic amount information when the transmission destination of the outgoing mail is the external network; and adding, to a header of the outgoing mail, the verification information and characteristic amount target item information corresponding to the characteristic amount target item; and at a time of receiving a mail, generating second characteristic amount target information including a characteristic amount target item indicated by the characteristic amount target item information added to the incoming mail, from among a header item, a body text, and attached information, included in the incoming mail, or generating second characteristic amount information from the second characteristic amount target information on the basis of the predetermined function;

decrypting, using the internal transmission secret key information, the verification information added to the incoming mail when a transmission source of the incoming mail is the internal network, decrypting, using the external transmission public key information, the verification information added to the incoming mail when the transmission source of the incoming mail is the external network, and generating third characteristic amount target information or third characteristic amount information; and comparing the second characteristic amount target information or the second characteristic amount information with the third characteristic amount target information or the third characteristic amount information, and verifying whether or not the second characteristic amount target information or the second characteristic amount information and the third characteristic amount target information or the third characteristic amount information coincide with each other;

preliminarily storing, in the transmitting terminal and the receiving terminal, wherein the internal transmission secret key information used in an electronic mail addressed to the internal network and verification information generation algorithm version information, and preliminarily generating the external transmission secret key information used in an electronic mail addressed to the external network and the external transmission public key information corresponding to the external transmission secret key information;

at the time of transmitting a mail, wherein generating, on the basis of an encryption algorithm, first verification information by encrypting, using the internal transmission secret key information, first characteristic amount target information including a characteristic amount target item from among a header item, a body text, and attached information, included in and outgoing mail, or first characteristic amount information generated from the first characteristic amount target information on the basis of a characteristic amount generation algorithm when a transmission destination of the outgoing mail is the internal network, and generating, on the basis of an encryption algorithm, the first verification information by encrypting, using the external transmission secret key information, the first characteristic amount target information or the first characteristic amount information when the transmission destination of the outgoing mail is the external network;

generating second verification information by encrypting, using the internal transmission secret key information or the external transmission secret key information, fourth characteristic amount information generated from first verification information generation algorithm version information stored on a transmitting side, on the basis of the characteristic amount generation algorithm, or the first verification information generation algorithm version information; and adding the first and second pieces of verification information to a header of the outgoing mail; and at the time of receiving a mail, wherein acquiring second verification information generation algorithm version information stored on a receiving side or generating fifth characteristic amount information from the second verification information generation algorithm version information on the basis of the characteristic amount generation algorithm;

generating third verification information generation algorithm version information or sixth characteristic amount information by decrypting, using the internal transmission secret key information or the external transmission public key information, the second verification information added to the incoming mail;

comparing the second verification information or the fifth characteristic amount information with the decrypted first verification information generation algorithm version information or the sixth characteristic amount information, and verifying whether or not the second version information or the fifth characteristic amount information and the decrypted first verification information generation algorithm version information or the sixth characteristic amount information coincide with each other;

generating second characteristic amount target information including the characteristic amount target item from among a header item, a body text, and attached information, included in the incoming mail, or generating second characteristic amount information from the second characteristic amount target information on the basis of the characteristic amount generation algorithm;

decrypting, using the internal transmission secret key information or the external transmission public key information, the first verification information added to the incoming mail, and generating third characteristic amount target information or third characteristic amount information; and comparing the second characteristic amount target information or the second characteristic amount information with the third characteristic amount target information or the third characteristic amount information, and verifying whether or not the second characteristic amount target information or the second characteristic amount information and the third characteristic amount target information or the third characteristic amount information coincide with each other.

2. A non-transitory computer-readable recording medium having stored therein a program for causing a computer in an electronic mail terminal device to execute fraudulent mail detection processing, the fraudulent mail detection processing comprising:

a preparation process configured to preliminarily share internal transmission secret key information used in an electronic mail addressed to an internal network, between a transmitting terminal and a receiving terminal, and preliminarily generate external transmission secret key information used in an electronic mail addressed to an external network and external transmission public key information corresponding to the external transmission secret key information;

at a time of transmitting a mail;

a verification information generating process configured to generate verification information by encrypting, using the internal transmission secret key information, first characteristic amount target information including a characteristic amount target item from among a header item, a body text, and attached information, included in and outgoing mail, or first characteristic amount information generated from the first characteristic amount target information on a basis of a predetermined function when a transmission destination of the outgoing mail is the internal network, and generate the verification information by encrypting, using the external transmission secret key information, the first characteristic amount target information or the first characteristic amount information when the transmission destination of the outgoing mail is the external network; and and addition process configure to add, to a header of the outgoing mail, the verification information and characteristic amount target item information corresponding to the characteristic amount target item; and at a time of receiving a mail, a characteristic amount generation process configured to generate second characteristic amount target information including a characteristic amount target item indicated by the characteristic amount target item information added to the incoming mail, from among a header item, a body text, and attached information, included in the incoming mail, or generate second characteristic amount information from the second characteristic amount target information on the basis of the predetermined function;

a decryption process configured to decrypt, using the internal transmission secret key information, the verification information added toe the incoming mail when a transmission source of the incoming mail is the internal network, decrypt, using the external transmission public key information, the verification information added to the incoming mail when the transmission source of the incoming mail is the external network, and generate third characteristic amount target information or third characteristic amount information; and verification process configured to compare the second characteristic amount target information or the second characteristic amount information with the third characteristic amount target information or the third characteristic amount information, and verify whether or not the second characteristic amount target information or the second characteristic amount information and the third characteristic amount target information or the third characteristic amount information coincide with each other;

a preparation process configured to preliminarily store, in the transmitting terminal and the receiving terminal, wherein the internal transmission secret key information used in an electronic mail addressed to the internal network and verification information generation algorithm version information, and preliminarily generate external transmission secret key information used in an electronic mail addressed to the external network and the external transmission public key information corresponding to the external transmission secret key information;

at the time of transmitting a mail;

wherein a first verification information generation process configured to generate, on the basis of an encryption algorithm, first verification information by encrypting, using the internal transmission secret key information, first characteristic amount target information including al characteristic amount target item form among a header item, a body text, and attached information, included in an outgoing mail, or first characteristic amount information generated from the first characteristic amount target information on the basis of a characteristic amount generation algorithm when a transmission destination of the outgoing mail is the internal network, and generate, on the basis of an encryption algorithm, the first verification information by encrypting, using the external transmission secret key information, the first characteristic amount target information or the first characteristic amount information when the transmission destination of the outgoing mail is the external network;

a second verification information generation process configured to generate second verification information by encrypting, using the internal transmission secret key information or the external transmission secret key information, fourth characteristic amount information generated from the first verification information generation algorithm version information stored on a transmitting side, on the basis of the characteristic amount generation algorithm, or the first verification information generation algorithm version information; and an addition process configured to add the first and second pieces of verification information to a header of the outgoing mail; and at the time of receiving a mail, wherein a second characteristic amount generation process configured to acquire second verification information generation algorithm version information stored on a receiving side or generate fifth characteristic amount information from the second verification information generation algorithm version information on the basis of the characteristic amount generation algorithm;

a second decryption process configured to generate third verification information generation algorithm version information or sixth characteristic amount information by decrypting, using the internal transmission secret key information or the external transmission public key information, the second verification information added to the incoming mail;

a second verification process configured to compare the second verification information or the fifth characteristic amount information with the decrypted first verification information generation algorithm version information or the sixth characteristic amount information, and verify whether or not the second version information or the fifth characteristic amount information and the decrypted first verification information generation algorithm version information or the sixth characteristic amount information coincide with each other;

a first characteristic amount generation process configured to generate second characteristic amount target information including the characteristic amount target item from among a header item, a body text, and attached information, included in the incoming mail, or generate second characteristic amount information from the second characteristic amount target information on the basis of the characteristic amount generation algorithm;

a first decryption process configured to decrypt, using the internal transmission secret key information or the external transmission public key information, the first verification information added to the incoming mail, and generate third characteristic amount target information or third characteristic amount information; and a first verification process configured to compare the second characteristic amount target information or the second characteristic amount information with the third characteristic amount target information or the third characteristic amount information, and verify whether or not the second characteristic amount target information or the second characteristic amount information and the third characteristic amount target information or the third characteristic amount information coincide with each other.

3. A fraudulent mail detection device comprising a memory storing a plurality of mechanisms that are executed by a processor, the processor executing:

a preparation mechanism configure to preliminarily share internal transmission secret key information used in an electronic mail addressed to an internal network, between a transmitting terminal and a receiving terminal, and preliminarily generate external transmission secret key information used in an electronic mail addressed to an external network and external transmission public key information corresponding to the external transmission secret key information;

at a time of transmitting a mail;

a verification information generation mechanism configured to generate verification information by encrypting, using the internal transmission secret key information, first characteristic amount target information including a characteristic amount target item from among a header item, a body text, and attached information, included in an outgoing mail, or first characteristic amount information generated from the first characteristic amount target information on a basis of a predetermined function when a transmission destination of the outgoing mail is the internal network, and generate the verification information by encrypting, using the external transmission secret key information, the first characteristic amount target information or the first characteristic amount information when the transmission destination of the outgoing mail is the external network; and an addition mechanism configured to add, to a header of the outgoing mail, the verification information and characteristic amount target item information corresponding to the characteristic amount target item; and at a time of receiving a mail, a characteristic amount generation mechanism configured to generate second characteristic amount target information including a characteristic amount target item indicated by the characteristic amount target item information added toe the incoming mail, form among a header item, a body text, and attached information, included in the incoming mail, or generate second characteristic amount information from the second characteristic amount target information on the basis of the predetermined function;

a decryption mechanism configured to decrypt, using the internal transmission secret key information, the verification information added to the incoming mail when a transmission source of the incoming mail is the internal network, decrypt, using the external transmission public key information, the verification information added to the incoming mail when the transmission course of the incoming mail is the external network, and generate third characteristic amount target information or third characteristic amount information; and a verification mechanism configured to compare the second characteristic amount target information or the second characteristic amount information with the third characteristic amount target information or the third characteristic amount information, and verify whether or not the second characteristic amount target information or the second characteristic amount information and the third characteristic amount target information or the third characteristic amount information coincide with each other;

a preparation mechanism configured to preliminarily store, in then transmitting terminal and the receiving terminal, wherein the internal transmission secret key information used in an electronic mail addressed to the internal network and verification information generation algorithm version information, and preliminarily generate external transmission secret key information used in an electronic mail addressed to the external network and the external transmission public key information corresponding to the external transmission secret key information;

at the time of transmitting a mail, wherein a first verification information generation mechanism configured to generate, on the basis of an encryption algorithm, first verification information by encrypting, using the internal transmission secret key information, first characteristic amount target information including a characteristic amount target item from among a header item, a body text, and attached information, included in an outgoing mail, or first characteristic amount information generated from the first characteristic amount target information on the basis of a characteristic amount generation algorithm when a transmission destination of the outgoing mail is the internal network, and generate, on the basis of an encryption algorithm, the first verification information by encrypting, using the external transmission secret key information, the first characteristic amount target information or the first characteristic amount information when the transmission destination of the outgoing mail is the external network;

a second verification information generation mechanism configured to generate second verification information by encrypting, using the internal transmission secret key information or the external transmission secret key information, fourth characteristic amount information generated from first verification information generation algorithm version information stored on a transmitting side, on the basis of the characteristic amount generation algorithm, or the first verification information generation algorithm version information; and an addition mechanism configured to add the first and second pieces of verification information to a header of the outgoing mail; and at the time of receiving a mail, wherein a second characteristic amount generation mechanism configured to acquire second verification information generation algorithm version information stored on a receiving side or generate fifth characteristic amount information from the second verification information generation algorithm version information on the basis of the characteristic amount generation algorithm;

a second decryption mechanism configured to generate third verification information generation algorithm version information or sixth characteristic amount information by decrypting, using the internal transmission secret key information or the external transmission public key information, the second verification information added to the incoming mail;

a second verification mechanism configured to compare the second verification information or the fifth characteristic amount information with the decrypted first verification information generation algorithm version information or the sixth characteristic amount information, and verify whether or not the second version information or the fifth characteristic amount information and the decrypted first verification information generation algorithm version information or the sixth characteristic amount information coincide with each other;

a first characteristic amount generation mechanism configured to generate second characteristic amount target information including the characteristic amount target item from among a header item, a body text, and attached information, included in the incoming mail, or generate second characteristic amount information from the second characteristic amount target information on the basis of the characteristic amount generation algorithm;

a first decryption mechanism configured to decrypt, using the internal transmission secret key information or the external transmission public key information, the first verification information added to the incoming mail, and generate third characteristic amount target information or third characteristic amount information; and a first verification mechanism configured to compare the second characteristic amount target information or the second characteristic amount information with the third characteristic amount target information or the third characteristic amount information, and verify whether or not the second characteristic amount target information or the second characteristic amount information and the third characteristic amount target information or the third characteristic amount information coincide with each other.

4. A non-transitory computer-readable recording medium having stored therein a program for causing a computer in an electronic mail terminal device to execute fraudulent mail detection processing, the fraudulent mail detection processing comprising:

a preparation process configured to preliminary share internal transmission secret key information used in an electronic mail addressed to an internal network, between a transmitting terminal and a receiving terminal, and preliminarily generate external transmission secret key information used in an electronic mail addressed to an external network and external transmission public key information corresponding to the external transmission secret key information;

at a time of transmitting a mail, a verification information generation process configured to generate verification information by encrypting, using the internal transmission secret key information, first characteristic amount target information including a characteristic amount target item from among a header item, a body text, and attached information, included in an outgoing mail, or first characteristic amount information generated from the first characteristic amount target information on a basis of a predetermined function when a transmission destination of the outgoing mail is the internal network, and generate the verification information by encrypting, using the external transmission secret key information, the first characteristic amount target information or the first characteristic amount information when the transmission destination of the outgoing mail is the external network; and an addition process configured to add, to a header of the outgoing mail, the verification information and characteristic amount target item information corresponding to the characteristic amount target item; and at a time of receiving a mail, a characteristic amount generation process configured to generate second characteristic amount target information including a characteristic amount target item indicated by the characteristic amount target item information added to the incoming mail, from among a header item, a body text, and attached information, included in the incoming mail, or generate second characteristic amount information from the second characteristic amount target information on the basis of the predetermined function;

a decryption process configured to decrypt, using the internal transmission secret key information, the verification information added to the incoming mail when a transmission source of the incoming mail is the internal network, decrypt, using the external transmission public key information, the verification information added to the incoming mail when the transmission source of the incoming mail is the external network, and generate third characteristic amount target information or third characteristic amount information; and a verification process configured to compare the second characteristic amount target information or the second characteristic amount information with the third characteristic amount target information or the third characteristic amount information, and verify whether or not the second characteristic amount target information or the second characteristic amount information and the third characteristic amount target information or the third characteristic amount information coincide with each other;

a preparation process configured to preliminarily store, in the transmitting terminal and the receiving terminal, wherein internal transmission secret key information used in an electronic mail addressed to the internal network and verification information generation algorithm version information, and preliminarily generate external transmission secret key information used in an electronic mail addressed to the external network and external transmission public key information corresponding to the external transmission secret key information;

at the time of transmitting a mail, wherein a first verification information generation process configured to generate, on the basis of an encryption algorithm, first verification information by encrypting, using the internal transmission secret key information, first characteristic amount information generated, on the basis of a characteristic amount generation algorithm, from first characteristic amount target information including a characteristic amount target item from among a header item, a body text, and attached information, included in an outgoing mail, when a transmission destination of the outgoing mail is the internal network, and generate, on the basis of an encryption algorithm, the first verification information by encrypting, using the external transmission secret key information, the first characteristic amount information when the transmission destination of the outgoing mail is the external network;

a second verification information generation process configured to generate second verification information by encrypting, using the internal transmission secret key information or the external transmission secret key information, fourth characteristic amount information generated from first verification information generation algorithm version information stored on a transmitting side, on the basis of the characteristic amount generation algorithm; and an addition process configured to add the first and second pieces of verification information to a header of the outgoing mail; and at the time of receiving a mail, wherein a second characteristic amount generation process configured to generate fifth characteristic amount information from second verification information generation algorithm version information stored on a receiving side, on the basis of the characteristic amount generation algorithm;

a second decryption process configured to generate sixth characteristic amount information by decrypting, using the internal transmission secret key information or the external transmission public key information, the second verification information added to the incoming mail;

a second verification process configured to compare the fifth characteristic amount information with the decrypted sixth characteristic amount information, and verify whether or not the fifth characteristic amount information and the decrypted sixth characteristic amount information coincide with each other;

a first characteristic amount generation process configured to generate, on the basis of the characteristic amount generation algorithm, second characteristic amount information from second characteristic amount target information including the characteristic amount target item from among a header item, a body text, and attached information, included in the incoming mail;

a first decryption process configured to decrypt, using the internal transmission secret key information or the external transmission public key information, the first verification information added to the incoming mail, and generate third characteristic amount information; and a first verification process configured to compare the second characteristic amount information with the third characteristic amount information, and verify whether or not the second characteristic amount information and the third characteristic amount information coincide with each other.

* * * * *